US006916499B1

(12) United States Patent
Landon

(10) Patent No.: US 6,916,499 B1
(45) Date of Patent: Jul. 12, 2005

(54) METHOD OF FORMING A LIGHT BUTTER

(75) Inventor: Todd Landon, Mound, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 351 days.

(21) Appl. No.: 10/110,699

(22) PCT Filed: Oct. 18, 2000

(86) PCT No.: PCT/US00/41263

§ 371 (c)(1),
(2), (4) Date: Apr. 15, 2002

(87) PCT Pub. No.: WO01/28349

PCT Pub. Date: Apr. 26, 2001

Related U.S. Application Data

(63) Continuation of application No. PCT/US00/41264, filed on Oct. 18, 2000.
(60) Provisional application No. 60/160,111, filed on Oct. 18, 1999, and provisional application No. 60/160,115, filed on Oct. 18, 1999.

(51) Int. Cl.[7] .............................................. A23C 15/00
(52) U.S. Cl. ...................................... 426/581; 426/491
(58) Field of Search .............................. 426/581, 530, 426/491, 582

(56) References Cited

U.S. PATENT DOCUMENTS

| 520,513 A | * | 5/1894 | Blakeman .................... 426/530 |
| 881,929 A | * | 3/1908 | Jensen ......................... 426/530 |
| 897,277 A | * | 9/1908 | Fay ............................. 426/417 |
| 1,024,009 A | | 4/1912 | Kronenberger |
| 1,210,918 A | * | 1/1917 | Eigelberner ................. 426/530 |
| 2,357,896 A | | 9/1944 | Howe .......................... 99/121 |
| 2,414,837 A | * | 1/1947 | Riggs ......................... 426/586 |
| 2,567,898 A | * | 9/1951 | Staaff ......................... 426/231 |
| 2,572,287 A | | 10/1951 | Strezynski ................... 259/96 |
| 2,603,568 A | * | 7/1952 | Nelson ....................... 426/581 |
| 2,612,454 A | * | 9/1952 | Bettman ..................... 426/581 |
| 2,617,731 A | | 11/1952 | Patton et al. ................ 99/119 |
| 2,754,213 A | | 7/1956 | Jones et al. ................. 99/123 |
| 3,443,966 A | | 5/1969 | Reid ........................... 99/118 |
| 3,505,077 A | * | 4/1970 | Bratland ..................... 426/570 |
| 3,519,435 A | * | 7/1970 | MacCollom ................ 426/586 |
| 3,772,447 A | * | 11/1973 | Damerow .................... 426/581 |
| 3,946,122 A | | 3/1976 | Scharp ........................ 423/604 |
| 4,017,643 A | * | 4/1977 | Lester ......................... 426/231 |
| 4,051,269 A | | 9/1977 | Strinning .................... 426/603 |
| 4,144,804 A | * | 3/1979 | O'Keefe et al. ............. 99/452 |
| 4,160,850 A | | 7/1979 | Hallstrom et al. .......... 426/601 |
| 4,425,370 A | | 1/1984 | Graves ........................ 426/603 |
| 4,436,760 A | | 3/1984 | Verhagen et al. |
| 4,438,149 A | | 3/1984 | Verhagen et al. ............ 426/603 |
| 4,447,463 A | * | 5/1984 | Antenore et al. ............ 426/603 |
| 4,555,411 A | | 11/1985 | Moran et al. ................ 426/603 |
| 4,615,892 A | | 10/1986 | Morehouse et al. |
| 4,702,928 A | | 10/1987 | Wieske et al. ............... 426/607 |
| 4,716,047 A | * | 12/1987 | Biernoth et al. ............. 426/603 |
| 4,820,539 A | * | 4/1989 | Lehmann et al. ............ 426/581 |
| 4,861,610 A | | 8/1989 | Kato et al. ................... 426/582 |
| 4,882,187 A | | 11/1989 | Izzo et al. .................... 426/335 |
| 4,952,606 A | | 8/1990 | Babayan et al. ............. 514/552 |
| 4,961,951 A | | 10/1990 | Crosby ........................ 426/602 |
| 5,112,636 A | | 5/1992 | Girsh .......................... 426/581 |
| 5,118,522 A | * | 6/1992 | Vermaat et al. ............. 426/581 |
| 5,158,797 A | * | 10/1992 | Studer et al. ................ 426/581 |
| 5,229,159 A | * | 7/1993 | Schwan ....................... 426/587 |
| 5,268,190 A | | 12/1993 | Gerhard ...................... 426/580 |
| 5,928,702 A | * | 7/1999 | Lidman et al. .............. 426/580 |
| 5,935,632 A | * | 8/1999 | Larsen ........................ 426/522 |
| 6,083,548 A | * | 7/2000 | Berntsen ..................... 426/530 |
| 6,228,409 B1 | * | 5/2001 | Axelsson .................... 426/397 |

FOREIGN PATENT DOCUMENTS

| DK | 0499614 | * | 7/1990 |
| EP | 0 347 007 | * | 12/1989 |
| EP | 0 347 008 | * | 12/1989 |
| FR | 2080763 | | 11/1971 |
| WO | WO91/07098 | * | 5/1991 |
| WO | WO 8910700 A | | 9/1993 |
| WO | WO 9319611 A | | 12/1993 |

OTHER PUBLICATIONS

Allen, 1943. Barrows and Companey, Double–Quick Cooking, New York, p 182–183.*
English Language Abstract of Max Erich Schultz; Edberhard Voss, Production of Readily Spreadable Dry Butter, 1967, vol. 3, pp 67–69, Int. Dairy Congr., Proc.
Abstract of F. A. Vyshemirskiy, N. V. Ivanova, Dried Concentrate of Butter: Granulometric Composition, Properties, Quality, 1993, No. 9303, pp. 453–454, International Dairy Federation Special Issue.
Abstract of US Patent No. 4436760 Issued Mar. 13, 1984, Verhagen et al.
English Language Abstract of Japanese Patent Document No. JP 62019049 A (Jul. 19, 1985).
English Language Abstract of Japanese Patent Document No. JP 05292880 A (Sep. 30, 1992).
Abstract of EPO Patent application EP 385541 A (Sep. 5, 1990).
Abstract of EPO Patent application EP 399580 A (Sep. 28, 1993).

(Continued)

Primary Examiner—Carolyn Paden
(74) Attorney, Agent, or Firm—Westman, Champlin & Kelly, P.A.

(57) ABSTRACT

A method of forming a light butter that includes removing water or butter fat from a feed material to yield a first intermediate and a second intermediate, the feed material including butter, the first intermediate including butterfat, the second intermediate including water, and at least the first intermediate or the second intermediate including interfacial butter solids, combining the first intermediate and the second intermediate to form an intermediate blend, and processing the intermediate blend to form the light butter.

36 Claims, 1 Drawing Sheet

OTHER PUBLICATIONS

Abstract of PCT Application No. WO 8910700 A (Sep. 23, 1993).

Abstract of PCT Application No. WO 9319611 A (Dec. 2, 1993).

Abstract of US Patent No. 4615892 Issued Oct. 7, 1986, Morehouse et al.

English Language Abstract of West German Patent Appl. No. 1 492 944, Sep. 25, 1969.

English Language Abstract of Russian Patent Document No. RU 2054264 C (Nov. 15, 1996).

English Language Abstract of Russian Patent Document No. RU 2110184 C (Dec. 10, 1998).

Abstract of German Democratic Republic Patent Document No. DD 225327 A (Sep. 25, 1993).

* cited by examiner

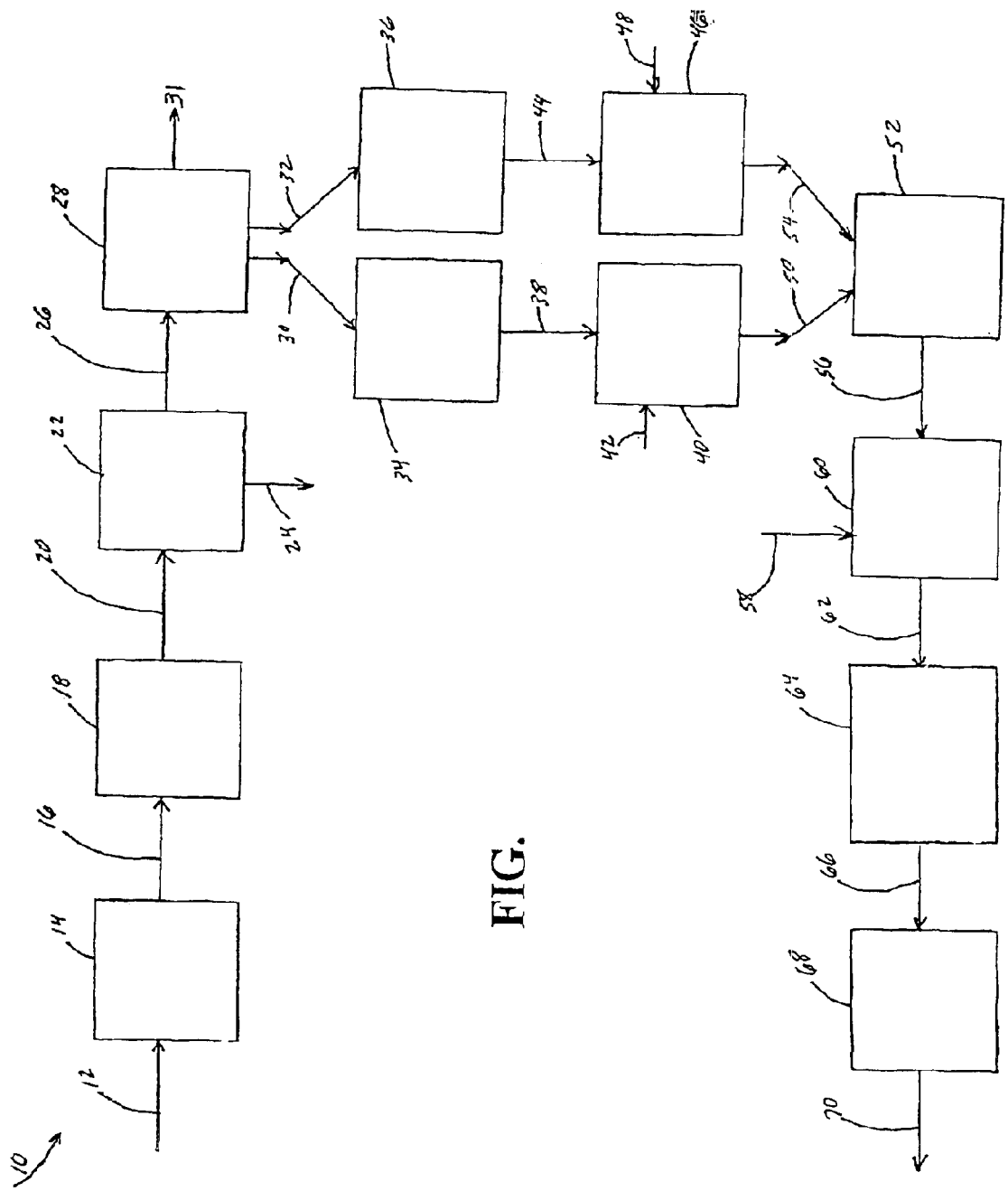

METHOD OF FORMING A LIGHT BUTTER

CROSS-REFERENCE TO RELATED APPLICATION(S)

This application is a 371 of PCT/US00/41263, filed Oct. 18, 2000, which claims the benefit of U.S. Provisional Patent Application Ser. No. 60/160,111, filed Oct. 18, 1999 and claims benefit of U.S. Provisional Patent Application Ser. No. 60/160,115, filed Oct. 18, 1999. This application also claims priority from PCT International Application No. PCT/US00/41264, filed Oct. 18, 2000.

BACKGROUND OF THE INVENTION

The present invention generally relates to a method of processing butter to form a light butter and other butter-based products. More specifically, the present invention relates to a method of concentrating interfacial butter solids of butter, to a method of incorporating the interfacial butter solids in light butter and other butter-based products, and to light butter and other butter-based products that contain a concentrated amount of the interfacial butter solids.

Butter preparation methods represent some of the oldest techniques for utilizing fat components that are found in milk. Butter manufacture has been accomplished in one form or another for over 4500 years. Over the centuries, butter has been used in sacrificial worship ceremonies, for medicinal and cosmetic purposes, and as a human food.

Butter production techniques generally evolved into more sophisticated techniques as new forms and uses of equipment developed. For example, the barrel churn made its appearance toward the end of the 18th century when non-wooden manufacturing materials entered widespread use in creaming and butter making equipment. These advances led to advances in cream separation techniques, and by 1879, continuous operation cream separators were known in Sweden, Denmark, and Germany. Likewise, butter production evolved from an individual farm activity to a factory based technique with the introduction of milk pooling systems for creamery operation in the 1870s. Later advances in fat quantification techniques, pasteurization, refrigeration, and bacterial culture usage further advanced the art of butter production.

Advances in butter production technology helped make butter a staple item in the kitchen. Certain components of butter, such as interfacial butter solids, give butter-based baked goods properties that are not achievable by margarines and presently available butter/margarine blends. For example, butter melts somewhat evenly in the mouth to yield a smooth, rich mouth-feel that is characteristic of butter. As another example, the protein and lactose components of butter gives desirable browning characteristics to baked goods that incorporate butter. Also, the phospholipid portion of butter gives body to baked goods and gives the baked goods the characteristic rich flavor long associated with butter. Phospholipids, proteins, and sugars, such as lactose, are each components of interfacial butter solids.

Despite these highly desirable taste and baking properties associated with butter, butter consumption came under attack by nutritionists and the medical profession during the 1970s and 1980s because of links thought to exist between butter consumption and certain health conditions. Also, butter prices tend to be relatively volatile over the long term. These factors led to increasing use of butter substitutes, such as margarine and butter/margarine blends, that included fat sources in addition to, or other than, butterfat. These factors also led to formulation of reduced-fat butter substitutes, such as reduced-fat butter, low fat butter, and spreads with total fat concentrations of less than about 80 weight percent, to further reduce the amount of saturated fats and calories in the human diet.

In accordance with labeling requirements of regulatory authorities in the United States, such as the United States Department of Agriculture (U.S.D.A.), butter, reduced-fat butter, light butter, margarine, and spreads have particularized meanings. For example, under the U.S.D.A. definition, butter, reduced-fat butter, and light butter are made exclusively from milk and/or cream, though butter, reduced-fat butter, and light butter may each contain additional coloring matter and salt. Under the U.S.D.A. regulations, butter may not contain less than 80 weight percent milkfat (also referred to as butterfat); reduced-fat butter contains 60 weight percent milkfat, or less; and low fat butter contains 40 weigh percent milkfat, or less. Also, under the U.S.D.A. definition, margarine may be made from milk and/or cream, along with fat sources other than milk and cream, though margarine must contain at least 80 weight percent total fat. Finally, under the U.S.D.A. definitions, a spread may be made from milk and/or cream along with fat sources other than milk and cream, and may contain less than 80 weight percent total fat.

The meanings of "butter", "reduced-fat butter", "light butter", "margarine", and "spread" vary significantly between different countries due to varying regulatory requirements from country to country. Thus, while a particular material may be properly referred to as light butter in the U.S., it may be improper to refer to that same material as light butter in another country, and vice versa. Unless otherwise indicated, references made herein to "reduced-fat butter", "light butter", "margarine", and "spread" are generally based upon the U.S.D.A. definitions for these materials for purposes of clarity and consistency, though it is to be understood that the light butter and other butter-based products, such as reduced-fat butter and butter-containing spreads, that may be produced in accordance with the present invention are not limited by any definitional or regulatory requirement(s) of any particular country or government entity, except as otherwise indicated subsequently herein.

Existing butter/margarine blends are typically based on butter, other fat sources, such as soybean oil; cottonseed oil, canola oil, and other types of vegetable oils; water; and emulsifying agents, such as monoglycerides and diglycerides. Margarines and spreads are typically based on various combinations of water and vegetable oils and may include or exclude butterfat, depending upon the formulation of the particular margarine or the particular spread. While margarines and butter/margarine blends generally have a fat content of at least 80 weight percent, reduced-fat butter substitutes, such as light butter, reduced-fat butter, and spreads have fat concentrations lower than 80 weight percent, that may range down to about 30 weight percent, or even less, for some reduced-fat butter substitutes, based upon the total weight of the particular reduced-fat butter substitute.

However, even existing margarines that include butterfat and existing butter/margarine blends that include butter do not yield the characteristic mouth-feel of butter and typically do not give baked goods the browning properties and body-yielding properties that are characteristic of butter. This is true even though numerous artificial butter flavoring compounds have been developed and incorporated into margarines and butter/margarine blends over the years. This loss of butter-like baking characteristics and mouth-feel is exacerbated further for reduced-fat butter substitutes that contain less than 80 weight percent fat.

Even though these alternatives to pure butter have helped to reduce the amount of saturated fats and calories in the human diet and have helped to stabilize the cost of supplying nutritionally necessary fat in the human diet, these advances have come at the cost of losing butter-like baking properties, such as the browning and baking characteristics yielded by butter, and the rich flavor and characteristic mouth-feel exhibited by butter. Thus, while still wishing to reduce the amount of saturated fats, total fat, and calories in the human diet, consumers, including household consumers and commercial baking concerns alike, long for an improved reduced-fat or light butter that accommodates health concerns about butterfat while achieving baking properties, mouth-feel properties, and flavor and taste that equal or even exceed those exhibited by butter.

BRIEF SUMMARY OF THE INVENTION

The present invention concerns a method of forming a butter-based product, such as a light butter, that includes removing water or butterfat from a feed material that includes butter to yield a first intermediate and a second intermediate. The first intermediate includes butterfat, the second intermediate includes water, and at least the first intermediate or the second intermediate includes interfacial butter solids. The method of forming the butter-based product further includes combining the first intermediate and the second intermediate to form an intermediate blend, and processing the intermediate blend to form the light butter. The present invention further includes a method of processing a feed material that comprises butter. The present invention additionally includes a butter-based product.

BRIEF DESCRIPTION OF THE DRAWING

The FIGURE is a schematic of a process for producing light butter and other butter-based products in accordance with the present invention.

DETAILED DESCRIPTION

The present invention generally relates to a method of processing butter to form a light butter and other butter-based products. More specifically, the present invention relates to a method of concentrating interfacial butter solids of butter, to a method of incorporating the interfacial butter solids in light butter and other butter-based products, and to light butter and other butter-based products that contain a concentrated amount of the interfacial butter solids.

A process for preparing butter-based products of the present invention, such as light butter, reduced-fat butter, and butter-based spreads, is generally depicted at 10 in the FIGURE. First, a feed material 12, such as butter or a mixture of butter and one or more additional components, is heated using a heat exchange mechanism 14, such as a steam-jacketed pipe, to form a liquid feed material 16, such as melted butter or a liquid composition containing melted butter, and thereby remove all crystallization memory of the butter. The liquid feed material 16 is placed in an agitated and heated tank 18. Mixed liquid feed material 20 is then transferred from the tank 18 to an evaporator 22 to concentrate the mixed liquid feed material 20 by removing water 24 from the mixed liquid feed material 20 under controlled vacuum and temperature conditions.

A reduced water-content material 26 that is derived in the evaporator 22 is then transferred to a separator 28 and separated into butterfat 30, byproduct butterfat 31, and a butter solids intermediate 32. The byproduct butterfat 31 exits the process 10 for further processing or for sale to customers as butterfat. The ratio of butterfat removed from the process 10 as byproduct butterfat 31 versus butterfat remaining in the process 10 as the butterfat 30 may be adjusted to provide products produced using the process 10 with different butterfat contents and concentrations.

The butterfat 30 is placed into a holding tank 34 and the butter solids intermediate 32 is placed into a holding tank 36. The holding tank 34 and/or the holding tank 36 may be heated, as necessary, to maintain the butterfat 30 as a liquid and/or to maintain the butter solids intermediate 32 as a liquid. Additionally, the tanks 34, 36 may be agitated to maintain the homogeneity of the butterfat 30 and the homogeneity of the butter solids intermediate 32, respectively. The composition of the butterfat 30 may be left unchanged in the holding tank 34 and the composition of the butter solids intermediate 32 may be left unchanged in the holding tank 36.

The butterfat 30 is metered from the holding tank 34 as butterfat 38 into a weigh and mix tank 40. Optional emulsifying agent 42 may be added to the weigh and mix tank 40 and dispersed within the butterfat 38. The ratio of emulsifying agent 42 to butterfat 38 in the weigh and mix tank 40 may be selectively adjusted to attain desired properties in butter-based products, such as light butter and butter-based spreads, that may be produced using the process 10.

The butter solids intermediate 32 is metered from the holding tank 36 as butter solids intermediate 44 to a weigh and mix tank 46. Food grade salt 48 may optionally be added to the weigh and mix tank 46 and dispersed within the butter solids intermediate 44. The ratio of salt 48 to butter solids intermediate 44 in the weigh and mix tank 46 may be selectively adjusted to attain any desired salt content in butter-based products, such as light butter and butter-based spreads, that are produced using the process 10.

A butterfat component 50 is discharged from the weigh and mix tank 40, after blending of the butterfat 38 and any emulsifying agent 42, into a weigh and mix tank 52. The butterfat component 50 is then heated in the weigh and mix tank 52. A butter solids intermediate 54 that is discharged from the weigh and mix tank 46 is then slowly added to the heated butterfat component 50 in the weigh and mix tank 52 under high shear mixing conditions to disperse the butter solids intermediate 54 in the heated butterfat component 50 and form a water-in-fat dispersion, namely an intermediate blend 56.

The intermediate blend 56 along with optional additive(s) 58 are combined, blended, and agitated in a blend tank 60 to form a butter-based product, such as a butter/margarine blend, a butter-based spread, a reduced-fat butter, or a light butter 62. Though the butter-based product that exits the blend tank 60 is subsequently referred to primarily in terms of the light butter 62, it is to be understood that the butter-based product that exits the blend tank 60 may alternatively be butter, a butter/margarine blend, a reduced-fat butter, a butter-based spread, or any other water-in-fat dispersion that includes interfacial butter solids from the butter of the feed material 12 and also includes at least some water and/or butterfat from the butter of the feed material 12.

The butter-based product, such as the light butter 62, may be conventionally processed in traditional margarine and butter crystallization equipment 64, such as a swept surface heater exchanger or a chill roller, to form solidified light butter 66. The solidified light butter 66 may be packaged in conventional butter and margarine packing equipment, such as a packing unit 68, to yield a packaged light butter product 70.

In the process 10, the feed material 12 may be or may include any butter. As used herein, all references to "butter" are to be understood as referring to a dairy product prepared by churning, or equivalently processing, milk and/or cream, though other optional ingredients beyond milk and/or cream may be included during the butter production. The churning or equivalent processing may be accomplished in either batch-wise or continuous fashion. The source of the milk and/or cream that is used to form the butter may be bovine, ovine, caprine, or the like. The butter that makes up some or all of the feed material 12 may generally take any form, such as semi-solid, pumpable butter that exits the churning process; chilled solid butter, or butter that has been melted to form liquid butter.

Non-dairy ingredients, preferably other minor non-dairy ingredients, such as salt, a coloring agent, and/or vitamins, may optionally be included in the milk and/or cream that is churned to form the butter or may optionally be added to the milk and/or cream during the churning process. Preferably, however, salt, if added, is added at the weigh and mix tank 46, and other minor non-dairy ingredients, such as vitamins, lactic acid, and/or the coloring agent, are added at the blend tank 60 to simplify operational considerations for the evaporator 22 and the separator 28.

Non-dairy fat may also optionally be added to the milk and/or cream that is processed to form the butter or may be added to the milk and/or cream during the butter production process. Non-dairy fat is preferably not added to the milk and/or cream either before or during processing of the milk and/or cream to form the butter, since some of any such added non-dairy fat would likely be present in the buttermilk byproduct of the butter forming process and would reduce the value of the byproduct buttermilk. Also, non-dairy fat is preferably not added to the milk and/or cream either before or during processing of the milk and/or cream to form the butter, since any such addition of non-dairy fat would prevent the butter being formed from being labeled as butter, and would prevent the intermediate blend 56, the light butler 62, the solidified light butter 66, and the packaged light butter product 70 of the present invention from being labeled as butter-based products, such as light butter, under the present dietary labeling standards of United States regulatory authorities, such as the U.S. Department of Agriculture (U.S.D.A.).

Churning of milk and/or cream initially causes fractionation of the milk and/or cream into (1) an aqueous phase that yields a buttermilk byproduct and (2) a fat phase that includes milk fat globules. The churning process also causes aggregation of milk fat globules that, with the aid of various interfacial butter solids such as phospholipids, entrap water molecules from the aqueous phase to form the water-in-fat dispersion that predominantly or exclusively exists in butter. It is believed that the water-in-fat dispersion of butter is not a true emulsion, but instead represents a surface absorption phenomena in which water is absorbed within a matrix of milk fat globules. Additionally, it is believed that the solids leaving as part of the aqueous buttermilk byproduct of the churning process are qualitatively different in nature than the solids remaining in the butter produced by churning, since the taste of this aqueous buttermilk byproduct is qualitatively quite different from the taste of the aqueous layer resulting when butter is melted and stratified into a fat layer and an aqueous layer.

Unless otherwise indicated, all references to "interfacial butter solids" are to be understood as referring to the solid particles and/or semi-solid particles that tend to congregate proximate the interface of the aqueous phase and the fat phase of melted butter (1) when the temperature of the melted butter is in the range of about 80° F. (about 26.7° C.) to about 145° F. (about 63° C.) and (2) when the aqueous phase and the fat phase are permitted to separate under the influence of gravity or when the aqueous phase and the fat phase are forced to separate, such as by processing the melted butter in a centrifuge. Some components of the "interfacial butter solids", such as proteins and sugars, tend to exist in the aqueous phase of the melted butter proximate the interface, while other components of the "interfacial butter solids", such as phospholipids, tend to exist proximate the interface of the fat phase and the aqueous phase of the melted butter in both the fat phase and the aqueous phase of the melted butter.

Consequently, the "interfacial butter solids" includes those solid particles and/or semi-solid particles that tend to congregate proximate the interface of the aqueous phase and the fat phase of the melted butter under the influence of gravity or physical separation, no matter whether those solid particles and/or semi-solid particles are in the aqueous phase, the liquid phase, or both the aqueous phase and the liquid phase of the melted butter. Additionally, solid particles and/or semi-solid particles of the interfacial butter solids may be dissolved (solubilized) in the aqueous phase and/or the fat phase of the melted butter.

The term "interfacial butter solids" includes all solid particles and/or semi-solid particles that tend to congregate proximate the interface of the aqueous phase and fat phase of melted butter, rather than only solid particles and/or semi-solid particles that actually have congregated proximate the interface of the aqueous phase and the fat phase of melted butter. The term "interfacial butter solids" excludes any non-dairy additives, such as salt, that are added to the milk and/or cream that is processed to form the butter and also excludes any non-dairy additives that are added to the milk and/or cream during the butter production process or that are added to the butter after the butter production process. The term "interfacial butter solids" also excludes any non-dairy fat that is added to the milk and/or cream that is processed to form the butter, any non-dairy fat that is added to the milk and/or cream during the butter production process, and any non-dairy fat that is added to the butter after the butter production process. Additionally, unless otherwise-indicated, the term "non-dairy" means not a dairy material and not derived from a dairy material. Milk, cream, whey, cheese, and butter are some non-exhaustive examples of dairy materials.

As noted, some components of the "interfacial butter solids", such as proteins and sugars, tend to exist in the aqueous phase of the melted butter proximate the interface. Therefore, these protein and sugar components of the interfacial butter solids will predominantly, if not nearly exclusively, remain in the aqueous phase after removal of the aqueous phase from the melted butter. Also as noted, other components of the "interfacial butter solids", such as phospholipids, tend to exist proximate the interface of the fat phase and the aqueous phase of the melted butter with part of each phospholipid molecule typically located in the aqueous phase of the melted butter and with another part of each phospholipid molecule typically located in the fat phase of the melted butter. Nonetheless, upon removal of the aqueous phase from melted butter, most, if not essentially all, of the phospholipids tend to stay with the aqueous phase; this tendency of the phospholipids to stay with the aqueous phase instead of with the fat phase upon removal of the aqueous phase from the melted butter is believed to occur because the attraction of each phospholipid molecule portion present in the aqueous phase to the aqueous phase tends to be stronger than the attraction of each corresponding phospholipid molecule portion present in the fat phase is to the fat phase. Despite this observation, when separating the aqueous phase and the fat phase of the reduced water-content material 26 into the butterfat 30, the byproduct butterfat 31, and the butter solids intermediate 32, some butterfat may be allowed to stay with the aqueous phase (butter solids intermediate 32), to maximize, as desired, the amount of the phospholipid component of the interfacial butter solids that remains in the butter solids intermediate 32.

Additionally, unless otherwise indicated, all references to "butterfat" are to be understood as referring to dairy (milk) fat that is both (1) present in butter and (2) present in the liquid dairy material, such as milk, cream, or combination of milk and cream, that is processed to form the butter. Consequently, unless otherwise indicated, the term "butterfat" excludes non-dairy fat, including, but not limited to, any non-dairy fat that is added to, or as, feed components of the butter production process; any non-dairy fat that is added to the butter production process during butter manufacture; and any non-dairy fat that is added to the butter after the butter production process.

The feed material 12 preferably contains, and more preferably consists of, butter that is recognized as butter in the United States by regulatory authorities, such as the Department of Agriculture (U.S.D.A.). The U.S.D.A. defines butter as follows:

The food product usually known as butter, and which is made exclusively from milk or cream, or both, with or without additional coloring matter, and containing not less than 80 percent by weight of milkfat, all tolerances having been allowed for.

7 C.F.R. §58.305(a), revised Jan. 1, 1997. Generally, however, the feed material 12 may contain or may consist of any butter, such as butter formed by churning. This means that butter present in the feed material 12 will typically have a butterfat concentration of at least about 60 weight percent, based on the total weight of the butter leaving the butter production process, since the aggregation of milk fat molecules into the "butterfat" matrix that entraps water molecules will typically not form if the milk fat concentration of the in-process dairy material that is transformed into butter is less than about 60 weight percent, based on the total weight of the in-process dairy material.

For purposes of marketing the intermediate blend 56, the light butter 62, and/or the solidified light butter 66 to American consumers, the butter that forms, or is part of, the feed material 12 is preferably based upon dairy material that is produced by or derived from dairy cattle in the United States, since the palates of American consumers are accustomed to dairy material that is produced by or derived from dairy cattle in the United States. Dairy cattle in other regions of the world are often fed or grazed upon different feeds than dairy cattle in the United States. For example, dairy cattle in New Zealand are typically grazed on clover which gives butter a unique flavor that is typically not appreciated by American consumers.

For purposes of marketing the intermediate blend 56, the light butter 62, and/or the solidified light butter 66 to consumers in countries other than the United States, the butter that forms, or is part of, the feed material 12 may be based upon dairy material that is produced by or derived from dairy cattle in countries other than the United States, while realizing that consumers in a particular country will typically prefer dairy products that are based upon dairy material produced by or derived from dairy cattle in that particular country.

The time between formation of the butter and introduction of the butter into the process 10 as the feed material 12 or as a component of the feed material 12 is preferably minimized to maximize the "fresh churned" butter taste of products produced in accordance with the present invention. Though not wishing to be bound by theory, it is believed that air entrained in butter during the churning process causes or contributes to degradation of flavor components in freshly-churned butter that are responsible for the difference between the taste of freshly churned butter and the taste of butter that can no longer be considered to be fresh churned. Therefore, the butter that forms, or is part of, the feed material 12 is preferably freshly churned butter that has been produced no more than about 8 hours prior to being incorporated in the process 10. In one particularly preferred embodiment, the butter that forms, or is part of, the feed material 12 is introduced into the process 10 in semi-solid form directly from the churning process to minimize the time between formation of the butter and feeding of the butter to the process 10 as the feed material 12 or as a component of the feed material 12.

Additionally, in the process 10, the feed material 12, the liquid feed material 16, the mixed liquid feed material 20, the reduced water-content material 26, the butterfat 30, the butter solids intermediate 32, the butterfat 38, the emulsifying agent 42, the butter solids intermediate 44, the butterfat component 50, the butter solids intermediate 54, the intermediate blend 56, the light butter 62, the solidified light butter 66, the packaged light butter product 70, and derivatives of any of these streams are each preferably handled carefully in the process 10 to minimize damage to these streams or to any components of these streams. Careful handling entails minimizing, and preferably eliminating, exposure of these streams to temperatures above about 160° F. (above about 71.1° C.). Though the mixed liquid feed material 20 may be exposed to a temperature of about 200° F. (about 93.3° C.) to about 210° F. (about 98.9° C.) prior to and immediately after entering the evaporator 22, this high temperature exposure is brief, since the material 20 rapidly cools to approximately 140° F. (about 60° C.), or less, soon after entering the evaporator 22. Also, all processing and handling of these streams in the process 10 is preferably done under conditions that minimize the potential for oxidation of these streams, or of components of these streams, such as by blanketing these streams with an inert gas, such as nitrogen. Furthermore, transfer of these streams within the process 10 is preferably accomplished using a positive displacement pump, such as a lobe-type pump or a high pressure piston pump of the type typically used in dairy homogenizers.

Although the feed material 12 preferably consists of only butter, the feed material 12 may permissibly include one or more other materials in addition to butter. When other material(s) in addition to butter are included in the feed material 12, the concentration of butter in the feed material 12 is preferably at least about 50 weight percent, more preferably at least about 75 weight percent, and still more preferably at least about 90 weight percent, based on the total weight of the feed material 12. Butter is preferably the major, more preferably the predominant, and most preferably the only component of the feed material 12, since the interfacial butter solids that are present in butter and that are concentrated in accordance with the present invention provide the desirable, enhanced baking, flavor, and mouth-feel properties that are achieved in products that are produced in accordance with the present invention.

Nonetheless, in place of some or all of the butter, the feed material 12 may optionally include any butter material that is derived from butter, so long as the butter material includes interfacial butter solids. In addition to interfacial butter solids, the optional butter material may optionally also include butterfat, water, or any combination of water and butterfat in any concentration. Also, in addition to butter and the optional butter material, the feed material 12 may permissibly, though preferably does not, include any non-dairy fat, such as lard, beef tallow, vegetable oil, and/or shortening; water; any food grade coloring agent(s); any food grade emulsifying agent(s) such as lecithin, a monoglyceride, or a diglyceride; or any combination of any of these.

If the optional butter material is included in the feed material 12, the interfacial butter solids concentration in the butter material is preferably about the same as the concentration of interfacial butter solids in the butter that is used as part of the feed material 12. This preference is based upon the fact that centrifugal separation equipment that may be used as the separator 28, at some operating conditions, has been found to sometimes lose some amount of interfacial butter solids during U.S.D.A. mandated "burping" of the centrifugal separation equipment. It is believed that the interfacial butter solids losses from the centrifugal separator will tend to increase, as a percentage of the total interfacial butter solids in the feed material 12, as the concentration of interfacial butter solids increases in the feed material 12. Thus, while it is entirely desirable to have interfacial butter solids in the feed material 12, the concentration of interfacial butter solids included in the optional butter material is preferably about the same as the concentration of interfacial butter solids in the butter of the feed material 12 to avoid enhancing the relative amount of interfacial butter solids lost due to U.S.D.A.-mandated burping of any centrifugal separator that is used as the separator 28.

Likewise, the content of solids other than interfacial butter solids in the feed material 12 is preferably minimized to minimize loss of interfacial butter solids during the U.S.D.A.-mandated burping of any centrifugal separator used as the separator 28. For this reason, and to minimize the potential for corrosion in the evaporator 22, the butter that is used in or as the feed material 12 is preferably unsalted butter, since any desired salt may be added later in the process 10 to the weigh and mix tank 46.

Furthermore, the feed material 12 preferably does not include any non-dairy fat, since addition of non-dairy fat as part of the feed material 12 would increase the expense and the amount of work needed to concentrate the interfacial butter solids using the evaporator 22 and the separator 28. Also, any non-dairy fat added as part of the feed material 12 would diminish the market value of the byproduct butterfat 31 that is discharged from the separator 28, absent difficult separation of non-airy fat from the byproduct butterfat 31. Likewise, the feed material 12 preferably does not include any added water beyond water present in the aqueous phase of butter, since addition of extra water as part of the feed material 12 would also increase the expense and the amount of work needed to concentrate the interfacial butter solids using the evaporator 22.

Additionally, the feed material 12 preferably does not include any food grade emulsifying agent(s), since it has been found that, depending upon the concentrations of interfacial butter solids in the butterfat component 50 and in the butter solids intermediate 54, and the ratio of the butterfat component 50 to the butter solids intermediate 54 in the weigh and mix tank 52, the interfacial butter solids present in the feed material 12 may supply most, if not all, of the blending power necessary to form a stable water-in-fat dispersion in the intermediate blend 56. Furthermore, under some operating conditions, the presence of added food grade emulsifying agents in the feed material 12 may complicate removal of water via the evaporator 22 and/or separation of the butterfat 30 and byproduct butterfat 31 from the butter solids intermediate 32 in the separator 28.

The tank 18 in the process 10 functions as an accumulation tank for the liquid feed material 16 and balances differences between the flow rate of the feed material 12 and flow rate of the mixed liquid feed material 20. When the tank 18 is included in the process 10, the liquid feed material 16 is subjected to mild agitation, only, in the tank 18 that is sufficient to prevent stratification of components of the liquid feed material 16 and thereby avoid significant variations in the composition of the mixed liquid feed material 20 that is sent to the evaporator 22. As yet another alternative, the tank 18 may be left out of the process 10 in favor of a balance tank for the feed material 12, prior to heating of the feed material 12. Preferably, the feed material 12 balance tank or the tank 18 is included to provide an option of returning a portion of the reduced-water content material 26, a portion of the butterfat 30, and/or a portion of the byproduct butterfat 31 to the feed material 12 balance tank or the tank 18 for subsequent reflux in the evaporator 22 to enhance flavor development in the light butter 62. As discussed more fully below, it is believed that hydrolytic and/or hydrolysis reactions occurring during reflux contact between the butterfat and aqueous components in the evaporator 22 may enhance flavor development in the light butter 62.

The evaporator 22 may be or include any type of evaporation equipment, such as a vacuum can, a triple effect evaporator, a vacuum distillation tower, or any combination of any of these, that is capable of removing water 24 from the mixed liquid feed material 20. Preferably, the evaporator 22 allows components that are present in the mixed liquid feed material 20 to quickly cool to about 140° F. (about 60° C.), or less, soon after these components enter the evaporator 22 to minimize degradation of these components that become part of the reduced water-content material 26. As one non-exhaustive example, the evaporator 22 may consist of one or more vacuum cans (not shown) arranged either in series or in parallel, where a vacuum is created in the vacuum can(s) by a vacuum source, such as a vacuum pump. One suitable example of the evaporator 22 is a SENIOR™ vacuum chamber that is available from Kussel Equipment Company of Watertown, Wis. An ELMO®-P vacuum pump that may be obtained from Siemens Aktiengesellschaft of Munich, Germany may be used as the vacuum source for the SENIOR™ vacuum chamber.

Water 24 may be sequentially removed by multiple passes through the evaporator 22 or may be removed in one pass through the evaporator 22 by permitting a longer residence time of the mixed liquid feed material 20 in the evaporator 22. The purpose of removing water 24 in the evaporator 22 is to concentrate the interfacial butter solids of the butter that is used in or as the feed material 12. Therefore, the evaporator 22 preferably removes water 24 from the mixed liquid feed material 20 without removing any interfacial butter solids from the mixed liquid feed material 20.

Any technique that is capable of removing water from the feed material 12 or the mixed liquid feed material 20 may be substituted in place of the evaporator 22, so long as the technique is capable of minimizing, and preferably eliminating, removal of interfacial butter solids from the feed material 12 or from the mixed liquid feed material 20.

For example, as an alternative to the evaporator 22, the feed material 12 or the mixed liquid feed material 20 may be subjected to freeze-drying or spray drying to reduce the concentration of water in the feed material 12 or in the mixed liquid feed material 20. However, the process 10 preferably employs the evaporator 22 instead of freeze drying, since water removal using the evaporator 22 is less complicated than freeze drying and relies on equipment conventionally used in the dairy industry for water removal. Also, the process 10 preferably employs the evaporator 22 instead of spray drying, since spray drying would be expected to cause undesirable oxidation of one or more components of the mixed liquid feed material 20.

The separator 28 may be any piece of equipment (not shown), such as gravity separation equipment (a settling tank, for example) or mechanical separation equipment (a centrifuge, for example), that permits the aqueous phase and the butterfat phase of the butter to separate into substantially distinct layers and thereby permits separation of the reduced water-content material 26 into the butterfat 30, the byproduct butterfat 31, and the butter solids intermediate 32. The butterfat 30 and the byproduct butterfat 31 primarily contain butterfat. The butterfat 30 and the byproduct butterfat 31 may also contain a small amount of aqueous phase material of the type that forms the majority of the butter solids intermediate 32, though the amount of aqueous phase material in the butterfat 30 and the byproduct butterfat 31 is preferably minimized. The butter solids intermediate 32 primarily contains water and water soluble components along with the majority of the interfacial butter solids. The butter solids intermediate 32 may also contain a small amount of butterfat and butterfat soluble components to maximize, as desired, capture of interfacial butter solids, such as phospholipids, in the butter solids intermediate 32, though the amount of butterfat in the butter solids intermediate 32 is preferably minimized to a degree that is consistent with any desired maximized recovery of interfacial butter solids, such as phospholipids, in the butter solids intermediate 32.

Furthermore, multiple pieces of equipment may be provided that collectively operate as the separator 28. For example, the separator 28 may include a pair of settling tanks (not shown) that are arranged in series. In one of the tanks, the reduced water-content material 26 may be separated into a butterfat component (not shown) and the butter solids intermediate 32. Thereafter, the butterfat component may be separated into the butterfat 30 and the byproduct butterfat 31. Of course, alternative separation equipment, such as a centrifuge, may be substituted in place of one or both of these tanks.

Preferably, stratification of the butterfat phase and the aqueous phase of the reduced water-content material 26 occurs in the separator 28 to a substantial degree to maximize separation of the butterfat 30, the byproduct butterfat 31, and the butter solids intermediate 32 in the separator 28. When the separator 28 is a gravity separator, such as a settling tank, it has been determined that operating temperatures above about 145° F. (about 62.8° C.) in the separator 28 tend to reduce separation efficiency and consequently may cause undesirably high amounts of interfacial butter solids to be retained in the byproduct butterfat 31.

One example of a suitable piece of equipment that may serve as the separator 28 or as a component of the separator 28 is the BMRPX-S314 centrifuge that may be obtained from Alfa-Laval Separation, Inc. of Warminster, Pa. The BMRPX-S314 centrifuge may have a bowl speed of about 5,000 revolutions per minute (rpm), though the bowl is preferably powered by a variable speed drive that permits adjustment of the bowl speed to minimize, and preferably eliminate, loss of interfacial butter solids due to the aforementioned U.S.D.A.-mandated "burping" of the separator 28. For the BMRPX-S314 centrifuge, the top of the separator bowl is preferably maintained at a temperature above the melting point of butter, using a warm water bath, to prevent butterfat from solidifying and plugging the outlet for the aqueous phase (intermediate butte solids 32). If any clumps of solidified butterfat begin to form in the BMRPX-S314 centrifuge, these clumps may plug the outlet for the aqueous phase and cause loss of some of the aqueous phase (intermediate butte solids 32), and thus loss of some of the interfacial butter solids, to the byproduct butterfat 31.

As a general guideline, the degree of interfacial butter solids separation into the butter solids intermediate 32 and the butterfat 30, collectively, versus interfacial butter solids separation into the byproduct butterfat 31 may be gauged by the visual clarity of the byproduct butterfat 31. If the byproduct butterfat 31 is cloudy in appearance, it is likely that a significant amount of the interfacial butter solids has wound up in the byproduct butterfat 31, as opposed to the butter solids intermediate 32 and the butterfat 30, collectively. On the other hand, if the byproduct butterfat 31 is fairly clear (though colored) in appearance, most, if not all or predominantly all, of the interfacial butter solids have been separated into the butter solids intermediate 32 and the butterfat 30, collectively, as opposed to the byproduct butterfat 31.

The purpose of the separator 28 is (1) to permit splitting of the reduced water-content material 26 into the butterfat 30, the byproduct butterfat 31, and the butter solids intermediate 32 and (2) to recover interfacial butter solids in the butterfat 30 and the butter solids intermediate 32. Operation of the separator 28 preferably maximizes the concentration of interfacial butter solids in the butter solids intermediate 32 and in the butterfat 30, collectively, and minimizes the concentration of interfacial butter solids in the byproduct butterfat 31. More preferably, the butter solids intermediate 32 and the butterfat 30 that are separately discharged from the separator 28 collectively contain at least about 95 weight percent, or more, of the interfacial butter solids originally present in the feed material 12, and the byproduct butterfat 31 that exits the separator 28 contains little, if any, of the interfacial butter solids, such as about 5 weight percent, or less, of the interfacial butter solids originally present in the feed material 12.

Still more preferably, the separator 28 causes the butter solids intermediate 32 and the butterfat 30 to collectively contain at least about 99 weight percent, or more, of the interfacial butter solids originally present in the feed material 12 and causes about 1 weight percent, or less, of the interfacial butter solids originally present in the feed material 12 to be in the byproduct butterfat 31 that exits the separator 28. Most preferably, operation of the separator 28 causes all of the interfacial butter solids originally present in the feed material 12 to be in the butter solids intermediate 32 and the butterfat 30, collectively, and yields byproduct butterfat 31 that contains no or only de minimis amounts of interfacial butter solids.

The interfacial butter solids that are recovered in the separator may permissibly be present in the butterfat 30, in the butter solids intermediate 32, or in both the butterfat 30 and the butter solids intermediate 32. Changes between the interfacial butter solids content of the butterfat 30 relative to the interfacial butter solids content of the butter solids intermediate 32 have not been observed to cause any significant differences in the beneficial properties of the intermediate blend 56, the light butter 62, the solidified light butter 66, and the packaged light butter product 70, so long as sufficient interfacial butter solids are provided in the intermediate blend 56 and derivatives of the intermediate blend 56. Therefore, the interfacial butter solids may be generally distributed in any ratio between the butterfat 30 and the butter solids intermediate 32 so long as (1) recovery of interfacial butter solids in the butter solids intermediate 32 and the butterfat 30, collectively, is maximized and (2) sufficient interfacial butter solids are provided in the intermediate blend 56, and derivatives of the intermediate blend 56.

The interfacial butter solids are predominantly formed of proteins, sugars (predominantly lactose), and phospholipids. Consequently, unless otherwise indicated, all comments and statements that are provided herein about interfacial butter solids are equally applicable to proteins, sugars, and phospholipids, collectively. Thus, as another gauge of the degree of separation of the interfacial butter solids into the butter solids intermediate 32 and the butterfat, collectively, as opposed to the byproduct butterfat 31, one may rely on degree of separation of proteins, sugars, and phospholipids into the butter solids intermediate 32 and the butterfat 30, collectively, versus the degree of separation of proteins, sugars, and phospholipids into the byproduct butterfat 31. The amount and concentration of proteins and sugars in a particular sample, such as the butter solids intermediate 32, the butterfat 30, or the byproduct butterfat 31, may be determined using the Solids Non-Fat determination procedure that is provided below in the PROPERTY ANALYSIS AND CHARACTERIZATION PROCEDURE section of this document. Likewise, the amount and concentration of phospholipids in a particular sample, such as the butter solids intermediate 32, the butterfat 30, or the byproduct butterfat 31, may be determined using the Phospholipids determination procedure that is provided below in the PROPERTY ANALYSIS AND CHARACTERIZATION PROCEDURE section of this document. The results obtained from the Solids Non-Fat determination procedure and from the Phospholipids determination procedure may be combined to determine the amount and concentration of proteins, sugars, and phospholipids, collectively, in a particular sample, such as the butter solids intermediate 32, the butterfat 30, or the byproduct butterfat 31.

Operation of the separator 28 preferably maximizes the concentration of proteins, sugars, and phospholipids, collectively, in the butter solids intermediate 32 and the butterfat 30, collectively, and minimizes the concentration of proteins, sugars, and phospholipids, collectively, in the byproduct butterfat 31. More preferably, the butter solids intermediate 32 and the butterfat 30 that are separately discharged from the separator 28 collectively contain at least about 95 weight percent, or more, of the proteins, sugars, and phospholipids, collectively, that were originally present in the feed material 12, and the byproduct butterfat 31 that exits the separator 28 contains little, if any, of the proteins, sugars, and phospholipids, such as about 5 weight percent, or less, collectively of the proteins, sugars, and phospholipids originally present in the feed material 12.

Still more preferably, the separator 28 causes the butter solids intermediate 32 and the butterfat 30 to collectively contain at least about 99 weight percent, or more, of the proteins, sugars, and phospholipids, collectively, that were originally present in the feed material 12 and causes about 1 weight percent, or less, of the proteins, sugars, and phospholipids, collectively, that were originally present in the feed material 12 to be in the byproduct butterfat 31 that exits the separator 28. Most preferably, operation of the separator 28 causes all of the proteins, sugars, and phospholipids originally present in the feed material 12 to be in the butter solids intermediate 32 and the butterfat 30, collectively, and yields byproduct butterfat 31 that contains no or only de minimis amounts of proteins, sugars, and phospholipids.

Operation of the separator 28 preferably provides the butterfat 30 with a butterfat concentration of at least about 75 weight percent, more preferably with a butterfat concentration of at least about 90 weight percent, and still more preferably with a butterfat concentration of at least about 98 weight percent, based upon the total weight of the butterfat 30. Also, operation of the separator 28 preferably provides the byproduct butterfat 31 with a butterfat concentration of at least about 75 weight percent, more preferably with a butterfat concentration of at least about 90 weight percent, and still more preferably with a butterfat concentration of at least about 98 weight percent, based upon the total weight of the byproduct butterfat 31. Finally, operation of the evaporator 22 and separator 28 is preferably coordinated to provide the butter solids intermediate 32 with a water concentration of about 85 weight percent, or less; more preferably with a water concentration of about 80 weight percent, or less; and still more preferably with a water concentration of about 75 weight percent, or less.

To maximize the recovery of interfacial butter solids in the butterfat 30 and in the butter solids intermediate 32, some water may be, and typically is, allowed to remain in the reduced water-content material 26 that leaves the evaporator 22, and some butterfat may be allowed to remain in the butter solids intermediate 32 that is discharged from the separator 28. Permitting some water to remain in the reduced water-content material 26 typically helps to minimize, or even eliminate, losses of interfacial butter solids via the water 24 that exits the evaporator 22 and via the byproduct butterfat 31 that exits the separator 28. Likewise, permitting a small amount of butterfat to remain in the butter solids intermediate 32 may help to minimize, or even eliminate, losses of interfacial butter solids via the byproduct butterfat 31 that exits the separator 28.

Also, byproduct butterfat 31 may permissibly be removed at the separator 28 without removing any water 24 at the evaporator 22, if desired, to attain particular properties in the intermediate blend 56, the light butter 62, the solidified light butter 66, and/or the packaged light butter product 70. However, the concentration of water in the butter solids intermediate 32 is preferably minimized, to the extent possible, consistent with the goal of preferably maximizing the amount of interfacial butter solids retained in the butter solids intermediate 32 and the butterfat 30, collectively, versus the amount of interfacial butter solids originally present in the feed material 12. Furthermore, if byproduct butterfat 31 is removed without removing any water 24, addition of the optional emulsifying agent(s) may be required to obtain the desired water-in-fat dispersion of the intermediate blend 56, the light butter 62, the solidified light butter 66, and/or the packaged light butter product 70.

Though the separator 28 is depicted as being located after the evaporator 22 in the process 10, some or all removal of butterfat 30 and byproduct butterfat 31 may optionally occur prior to water 24 removal. This scenario would offer the advantage of reducing the amount of fluid needing to be heated to evaporate the water 24 in the evaporator 22. However, it is presently believed that evaporation of the water 24 prior to any butterfat 30 or byproduct butterfat 31 removal may cause some added flavor development as a result of short chain fatty acid cleavage from hydrolytic and/or hydrolysis reactions occurring during reflux contact between the butterfat and aqueous components of the mixed liquid feed material 20 in the evaporator 22. It is thought that the short chain fatty acids resulting from this cleavage may add to the potent flavor profile realized in the light butter 62 and other butter-based products that may be produced according to the present invention. Therefore, based upon this present understanding, it is preferred that most, and more preferably all, butterfat 30 and byproduct butterfat 31 removal occurs after water 24 removal.

The ultimate purpose of removing water 24 in the evaporator 22 and removing byproduct butterfat 31 in the separator 28 is to enhance the concentration of interfacial butter solids in the intermediate blend 56, as compared to the concentration of interfacial butter solids in the butter of the feed material 12. This is accomplished using the butter solids intermediate 32 and the butterfat 30, which serve as building blocks for creating products, such as the intermediate blend 56, that have a higher concentration of interfacial butter solids than ordinarily present in butter. Thus, an intermediate purpose of removing water 24 in the evaporator 22 and removing byproduct butterfat 31 in the separator 28 is to enhance the overall concentration of interfacial butter solids in the butterfat 30 and the butter solids intermediate 32, collectively, as compared to the concentration of interfacial butter solids in the butter of the feed material 12.

The butter solids intermediate 54, which consists of the butter solids intermediate 32 plus any added salt 48, may be blended with the butterfat component 50 that optionally incorporates the emulsifying agent 42 to attain products, such as the intermediate blend 56, having an elevated concentration of interfacial butter solids, as compared to the butter of the feed material 12, and a desired butterfat content. Thus, the amount of water 24 removed in the evaporator 22 and/or the amount of byproduct butterfat 31 removed in the separator 28 is preferably sufficient to achieve this elevated concentration of interfacial butter solids in the intermediate blend 56.

The aqueous phase of the butter of the feed material 12 has a weight percent A of interfacial butter solids, based upon the total weight of the aqueous phase of the butter. The evaporator 22 and the separator 28 may be operated to remove water 24, butterfat 30, and/or byproduct butterfat 31 in any ratio, relative to each other, to produce the butter solids intermediate 32 having an interfacial butter solids concentration B, based upon the total weight of the butter solids intermediate 32, that is the same as, or has been increased to any multiple such as 1.1, 2.0, 2.5, 3.0, 3.5, 4.0, etc. of, the A concentration of interfacial butter solids originally present in the aqueous phase of the butter of the feed material 12.

The fatty phase of the butter of the feed material 12 has a weight percent C of interfacial butter solids, based upon the total weight of the fatty phase of the butter. The evaporator 22 and the separator 28 may be operated to remove water 24, byproduct butterfat 31, and/or butter solids intermediate 32 in any ratio, relative to each other, to produce the butterfat 30 having an interfacial butter solids concentration D, based upon the total weight of the butterfat 30, that is the same as, or has been increased to any multiple such as 1.1, 2.0, 2.5, 3.0, 3.5, 4.0, etc. of, the C concentration of interfacial butter solids originally present in the fatty phase of the butter of the feed material 12.

The butter of the feed material 12 contains a weight percent E of interfacial butter solids, based upon the total weight of the butter. Consequently, due to the noted ability to manipulate the interfacial butter solids concentration B of the butter solids intermediate 32 relative to the interfacial butter solids concentration A originally present in the aqueous phase of the butter of the feed material 12 and the ability to manipulate the interfacial butter solids concentration D of the butterfat 30 relative to the interfacial butter solids concentration C originally present in the fatty phase of the butter of the feed material 12, the interfacial butter solids concentration B in the butter solids intermediate 32 and the interfacial butter solids concentration D in the butterfat 30 may be selected to effect, after addition of the butter solids intermediate 54 to the butterfat component 50, an interfacial butter solids concentration F in the resulting intermediate blend 56, based upon the total weight of the intermediate blend 56, that is the same as, or has been increased to any multiple such as 1.1, 2.0, 2.5, 3.0, 3.5, 4.0, etc. of, the E concentration of interfacial butter solids originally present in the butter of the feed material 12.

After the reduced water-content material 26 has been split into the butterfat 30, the byproduct butterfat 31 and the butter solids intermediate 32, the butterfat 30 is placed into the holding tank 34, which primarily functions as an accumulation tank. The composition of the butterfat 30 is typically not modified in the holding tank 34 and nothing is typically combined with the butterfat 30 in the holding tank 34. The holding tank 34 is preferably heated to maintain the butterfat 30 as a liquid.

The butterfat 38 is metered, in batch-wise fashion, from the holding tank 34 to the weigh and mix tank 40. The butterfat 38 is heated in the weigh and mix tank 40. Thereafter, emulsifying agent 42 may optionally be added to and dispersed within the butterfat 38. The emulsifying agent 42 is typically added to the butterfat 30, rather than to the butter solids intermediate 32, because addition of the emulsifying agent 42 to the butter solids intermediate 32 lends to bind up the butter solids intermediate 32 and consequently would be expected to limit the ability to disperse the emulsifying agent 42 within the intermediate blend 56. However, any interfacial butter solids component of the emulsifying agent 42 may permissibly be blended with either the butterfat 30 or the butter solids intermediate 32.

The objective of subsequently combining the butter solids intermediate 54 and the butterfat component 50 in the weigh and mix tank 52 is to obtain a stable water-in-fat dispersion. The necessity of incorporating the optional emulsifying agent 42 depends upon at least the following factors: (1) the weight ratio at which the butter solids intermediate 54 and the butterfat component 50 will be combined in the weigh and mix tank 52, (2) the interfacial butter solids concentration of the butterfat component 50, and (3) the interfacial butter solids concentration of the butter solids intermediate 54.

If the weight ratio of butter solids intermediate 54 to butterfat component 50 and the interfacial butter solids concentration in the butterfat 30 and in the butter solids intermediate 54 are adequate to support formation of the butter solids intermediate 54/butterfat component 50 blend as a stable water-in-fat dispersion, then the emulsifying agent 42 need not be included. On the other hand, if the weight ratio of butter solids intermediate 54 to butterfat component 50 and the interfacial butter solids concentrations in the butterfat 30 and the butter solids intermediate 54 are inadequate to support formation of the butter solids intermediate 54/butterfat component 50 blend as a stable water-in-fat dispersion, then the emulsifying agent 42 should be included.

In essence, the emulsifying agent 42 is used when the butter solids intermediate 54/butterfat component 50 blend would otherwise not form a stable water-in-fat dispersion. One scenario that may give rise to the need to incorporate the emulsifying agent 42 sometimes occurs when the butterfat concentration in the intermediate blend 56 is decreased to a relatively low level, of about 40 weight percent or less, based on the total weight of the intermediate blend 56, and the interfacial butter solids concentration in the intermediate blend 56, based on the total weight of the intermediate blend 56, is less than about three times the concentration of the interfacial butter solids originally present in the butter used as, or as part of, the feed material 12.

The optional emulsifying agent 42 may generally be any food grade emulsifying agent. Some examples of suitable classes of food grade emulsifying agents include monoglycerides, diglycerides, propylene glycol monoesters, lactylated esters, polyglycerol esters, sorbitan esters, ethoxylated esters, succinylated esters, fruit acid esters, acetylated monoglycerides, phosphated esters, sucrose esters, and any combination of any of these. One example of a suitable emulsifying agent is the DIMODAN® O distilled monoglyceride/diglyceride blend (~90% monoglycerides) that is available from Grinsted Ingredients, Inc. of New Century, Kans. Any of the emulsifying agents that is selected preferably has a low HLB (hydrophillic/lipophilic balance) and is consequently primarily lipophilic to support formation of the light butter 62 and other butter-based products of the present invention as a water-in-fat/oil dispersion.

Additionally, the emulsifying agent 42 may be or include interfacial butter solids that have been separated from butter in an analogous fashion to that described above for attaining a concentrated level of interfacial butter solids in the butter solids intermediate 32 and in the butterfat 30. The concentration of the emulsifying agent 42 in the intermediate blend 56 may generally be in the range of 0 weight percent to about 1 weight percent, based on the total weight of the intermediate blend 56.

The temperature to which the butterfat 38 is heated in the tank 40 is selected to facilitate any required melting and dispersion of the emulsifying agent 42 within the butterfat 38. The butterfat 38 will typically be heated to, and maintained at, a temperature in the range of about 105° F. (about 40.6° C.) to about 120° F. (about 48.9° C.) to accomplish melting and dispersion of the emulsifying agent 42 within the butterfat 38.

As an alternative and preferred approach to first blending optional emulsifying 42 with the butterfat 38 in the tank 40, it is sometimes better to make a premix of the emulsifying agent, such as the DIMODAN® O distilled monoglyceride/diglyceride blend, with some of the butterfat 38 outside of the tank 40, rather than first adding the emulsifying agent 42 to the butterfat 38 in the tank 40. Thereafter, the premix of the emulsifying agent 42 and the butterfat 38 is blended with the butterfat 38 that has previously been placed in the tank 40. This premix approach is preferred for emulsifying agents, such as the DIMODAN® O distilled monoglyceride/diglyceride blend, that have a melting point above the about 105° F. (about 40.6° C.) to about 120° F. (about 48.9° C.) temperature range maintained for the tank 40 contents. The premix approach avoids the necessity of heating the tank 40 contents to the elevated temperature, such as 140° F. (about 60° C.), that is needed to melt some emulsifying agents, and consequently helps to minimize exposure of the butterfat 38 to higher temperatures that may degrade components of the butterfat 38.

The premix emulsifying agent approach entails first mixing some of the butterfat 38 with some of the emulsifying agent 42 in a premix tank (not shown in the FIGURE). As an example, the DIMODAN® O distilled monoglyceride/diglyceride blend and the butterfat 38 may be blended together in the premix tank in an appropriate ratio, such as 1 part by weight of the DIMODAN® O distilled monoglyceride/diglyceride blend to 4 parts by weight of the butterfat 38. The blend of the emulsifying agent 42 and the butterfat 38 in the premix tank is then heated to a sufficient temperature, such as about 140° F. (about 60° C.) for the DIMODAN® O distilled monoglyceride/diglyceride blend, to melt and liquify the emulsifying agent 42. Thereafter, the blend of the emulsifying agent 42 and the butterfat 38 is mixed together and cooled in the premix tank to the about 105° F. (about 40.6° C.) to about 120° F. (about 48.9° C.) temperature range maintained for the tank 40 contents. Thereafter, the blend of the liquified emulsifying agent 42 and the butterfat 38 is transferred to the tank 40 from the premix tank and is homogeneously mixed with the butterfat 38 in the tank 40.

The weigh and mix tank 40 is preferably jacketed and equipped with a temperature controller to permit heating and/or cooling of the tank 40 contents, such as the butterfat 38 and the optional emulsifying agent 42, to a desired temperature in about 105° F. (about 40.6° C.) to about 120° F. (about 48.9° C.) range that may be maintained in the tank 40. The process 10 may include a plurality of the tanks 40 that are arranged in parallel with each other. This permits filling and mixing to occur in one of the tanks 40 while the contents of another of the tanks 40 are being transferred to the weigh and mix tank 52 for further processing. In one embodiment, each tank 40 has a capacity of about 600 gallons (about 2271 liters) and includes a center post agitator with agitation enhancement baffles that are attached within the tank. Any conventional agitation mechanism may be employed in each tank 40, so long as the level of mixing is adequate to insure dispersion of any added emulsifying agent 42 in the butterfat 38. Additionally, each tank 40 preferably has a slanted, cone-shaped bottom to permit complete emptying of the tank(s) 40. One suitable example of the tank(s) 40 is the WPDA (600 gallon/2271 liter capacity) process tank that is available from Waukesha Cherry-Burrell of Delavan, Wis.

After the reduced water-content material 26 has been split into the butterfat 30, the byproduct butterfat 31, and the butter solids intermediate 32, the butter solids intermediate 32 is placed into the holding tank 36, which primarily functions as an accumulation tank. The composition of the butter solids intermediate 32 is typically not modified in the holding tank 36 and nothing is typically combined with the butter solids intermediate 32 in the holding tank 36. The holding tank 36 is preferably heated to permit any butterfat in the butter solids intermediate 32 to remain liquid.

The butter solids intermediate 44 is metered, in batchwise fashion, from the holding tank 36 to the weigh and mix tank 46. The butter solids intermediate 44 is maintained at a temperature in the tank 46 that is adequate to cause any butterfat in the butter solids intermediate 44 to remain liquid. Salt 48 may optionally be added to and dispersed within the butter solids intermediate 44 in the tank 46 to give the subsequently prepared intermediate blend 56 a desired salt content that is typically in the range of about 1.2 weight percent salt to about 1.8 weight percent salt, based on the total weight of the intermediate blend 56. The salt 48 may be any food-grade salt, such as sodium chloride. The salt 48 is preferably added as part of an aqueous salt slurry to assist in homogeneously dispersing the salt 48 within the butter solids intermediate 44.

The weigh and mix tank 46 is preferably jacketed and equipped with a temperature controller to permit heating and/or cooling of the tank 46 contents, such as the butter solids intermediate 44, to a desired temperature in the tank 46. Again, the butter solids intermediate 44 is maintained at a temperature in the tank 46 that is adequate to cause any butterfat in the butter solids intermediate 44 to remain liquid. The process 10 may include a plurality of the tanks 46 that are arranged in parallel with each other. This permits filling and mixing to occur in one of the tanks 46 while the contents of another of the tanks 46 are being transferred to the weigh and mix tank 52 for further processing. The tank(s) 46 may, for example, each have the same configuration and agitation capability as the tank(s) 40. Thus, one suitable example of the tank(s) 46 is the WPDA (600 gallon\2271 liter capacity) process tank that is available from Waukesha Cherry-Burrell.

The butterfat component 50 is transferred from the weigh and mix tank 40 to the weigh and mix tank 52 in preparation for subsequent addition of the butter solids intermediate 54. Prior to being combined in the weigh and mix tank 52, the butterfat component 50 and the butter solids intermediate 54 are each heated to temperatures that, upon addition of the butter solids intermediate 54 to the butterfat component 50, (1) will permit uniform dispersion of the butter solids intermediate 54 in the butterfat component 50 and (2) will cause formation of the intermediate blend 56 as a stable water-in-fat dispersion that is preferably based on a continuous fat phase. Typically, these two objectives may be achieved with the butterfat component 50 at a temperature ranging from about 110° F. (about 43.3° C.) to about 125° F. (about 51.7° C.) and with the butter solids intermediate 54 at a temperature ranging from about 60° F. (about 15.6° C.) to about 80° F. (about 26.7° C.). Mixing the butterfat component 50 and the butter solids intermediate 54 that are within these temperature ranges will typically yield the intermediate blend 56 at a temperature ranging from about 75° F. (about 23.9° C.) to about 90° F. (about 32.2° C.) at typical blend ratios of the butterfat component 50 and the butter solids intermediate 54.

Of course, the exact temperatures selected for the butterfat component 50 and the butter solids intermediate 54, respectively, to achieve (1) uniform dispersion of the butter solids intermediate 54 in the butterfat component 50 and (2) formation of the intermediate blend 56 as a stable water-in-fat dispersion depend upon at least the following factors: (A) the weight ratio at which the butter solids intermediate 54 and the butterfat component 50 are combined in the weigh and mix tank 52, (B) the concentration of the interfacial butter solids in the butter solids intermediate 54, (C) the concentrations of emulsifying agent 42 and interfacial butter solids in the butterfat component 50, and (D) the fat profile of the butterfat component 50.

Preferably, the temperatures selected for the butterfat component 50 and the butter solids intermediate 54, respectively, are low enough to give the intermediate blend 56, upon formation, a temperature that supports pre-crystallization, i.e. formation of a relatively small amount of solid fat crystals in the continuous fat phase of the intermediate blend 56. The solid fat crystals preferably form to a degree in the continuous fat phase of the intermediate blend 56 that increases the viscosity of the continuous fat phase and consequently permits the continuous fat phase to hinder, and more preferably eliminate, coalescence of aqueous droplets. The precrystalized fat crystals also act as nuclei that promote an increased rate of crystallization in the crystallization equipment 64.

The relative amounts of the butterfat component 50 and the butter solids intermediate 54 that are added to the weigh and mix tank 52 may be adjusted as desired to selectively attain desired properties in light butter products and butter-based products that are produced using the process 10. Preferably, the relative amounts of butterfat component 50 and butter solids intermediate 54 are selected to increase the concentration of interfacial butter solids in the intermediate blend 56, light butter 62, solidified light butter 66, and packaged light butter product 70, relative to the concentration of interfacial butter solids in the butter used as, or as part of, the feed material 12.

Also, the relative amounts of the butterfat component 50 and the butter solids intermediate 54 that are added to the weigh and mix tank 52 may be adjusted to give the intermediate blend 56 a particular fat content. Generally, the fat content of the intermediate blend 56 may range from a lower limit of about 25 weight percent fat to about 80 weight percent fat, based on the total weight of the intermediate blend 56. At fat contents below about 25 weight percent, based on the total weight of the intermediate blend 56, formation of the required water-in-fat dispersion in the tank 52 becomes significantly more difficult and the undesired formation of a fat-in-water emulsion (cream) is significantly more likely to occur. In one preferred formulation, the fat content (as butterfat only) of the intermediate blend 56 ranges from about 25 weight percent fat to about 40 weight percent butterfat, based on the total weight of the intermediate blend 56, to permit labeling of the intermediate blend 56, light butter 62, solidified light butter 66, and packaged light butter product 70 as "light butter" products in accordance with the present dietary labeling standards of United States regulatory authorities, such as the U.S. Department of Agriculture (U.S.D.A.)

After the butterfat component 50 has been transferred to the tank 52, and after the butterfat component 50 and the butter solids intermediate 54 have been heated to the desired temperature, the butter solids intermediate 54 is slowly added to the butterfat component 50 in the tank 52 under conditions of high shear mixing. The butter solids intermediate 54 addition rate should be slow enough and the mixing conditions in the tank 53 should be aggressive enough to cause formation of the intermediate blend 56 as the water-in-fat dispersion, preferably with the continuous fat phase.

The weigh and mix tank 52 where the butter solids intermediate 54 is combined with the butterfat component 50 is preferably jacketed and equipped with a temperature controller to permit heating and/or cooling of the tank 52 contents. The process 10 may include a plurality of tanks 52 that are arranged in parallel with each other. This permits filling and mixing to occur in one of the tanks 52 while the contents of another of the tanks 52 are being transferred to the blend tank 60 for further processing. The tank(s) 52 may, for example, each have the same configuration and agitation capability as the tank(s) 40. Thus, one suitable example of the tank(s) 52 is the WPDA (600 gallon\2271 liter capacity) process tank that is available from Waukesha Cherry-Burrell.

For the purpose of modifying the fat profile of the intermediate blend 56, non-dairy fat (not shown) may optionally be combined with the butterfat in the weigh and mix tank 40, prior to addition of the optional emulsifying agent(s) 42. Thus, in addition to creating a product with an increased concentration of interfacial butter solids, as compared to the concentration of interfacial butter solids ordinarily present in butter, the process 10 may also be utilized to change the fat profile in the product from the fat profile originally present in the butter of the feed material 12. Of course, if non-dairy fat were added to the tank 40 to allow subsequent incorporation of non-dairy fat in the intermediate blend 56, the intermediate blend 56, the light butter 62, the solidified light butter 66, and the packaged light butter product 70 could no longer properly be labeled as "light butter" products in accordance with the present dietary labeling standards of United States regulatory authorities, such as the U.S. Department of Agriculture (U.S.D.A.).

Some non-exhaustive examples of suitable non-dairy fats include animal fats, such as lard and beef tallow; plant fats, such as shortening, vegetable oil, and tropical oils; marine oils, such as kelp oil and seaweed oil; fish oil, such as menhaden oil; and any of these in any combination. Some non-exhaustive examples of suitable vegetable oils include corn oil, peanut oil, soybean oil, canola oil, olive oil, and any of these in any combination. Some non-exhaustive examples of suitable tropical oils include coconut oil, palm oil, palm kernel oil, and any of these in any combination.

Any of the components of the non-dairy fat, if normally in the liquid phase at a particular temperature, may be hydrogenated to harden the non-dairy fat and thereby modify the viscosity and phase of the non-dairy fat, as desired. Furthermore, the non-dairy fat may be selected to achieve desired properties in the intermediate blend 56 and products derived from, based upon, and/or incorporating the intermediate blend 56. For example, the non-dairy fat may be selected to achieve, upon mixing of the butter solids intermediate 54 and the butterfat component 50, a particular amount of hardness or softness in butter-based products that are derived from or are based upon the intermediate blend 56. Thus, after concentrating the interfacial butter solids in the butter solids intermediate 32 and the butterfat 30, the non-dairy fat may be selectively chosen and added to the tank 40 to achieve particular properties in the intermediate blend 56 or in products derived from, based upon, and/or incorporating the intermediate blend 56 that are desired by a particular customer or particular properties that are more suitable for a particular application of the intermediate blend 56 or of products derived from, based upon, and/or incorporating the intermediate blend 56.

Though it is permissible to add non-dairy fat to the butterfat 38 in the tank 40, it is likewise also permissible to exclude non-dairy fat from the process 10. This alternative of excluding addition of non-dairy fat would produce the intermediate blend 56 with a concentrated level of interfacial butter solids, as compared to the concentration of interfacial butter solids in the butter of the feed material 12, while maintaining the original fat profile of the butter of the feed material 12. This alternative of excluding non-dairy fat may also be practiced when it is desired to produce the intermediate blend 56, the light butter 62, the solidified light butter 66, and the packaged light butter product 70 that may be properly labeled as "light butter" products in accordance with the present dietary labeling standards of United States regulatory authorities, such as the U.S. Department of Agriculture (U.S.D.A.).

Though not depicted, it also permissible to add non-dairy fat prior to the weigh and mix tank 40. For example, non-dairy fat may be included as part of the feed material 12. Preferably, however, non-dairy fat is not included as part of the feed material 12, since this would increase the volume of the feed material 12 needing to be heated to effect evaporation of the water 24. Also, non-dairy fat may be added prior to removal of the butterfat 30 and the byproduct butterfat 31 from the reduced water-content material 26. However, non-dairy fat, if included, is preferably not added prior to removal of the byproduct butterfat 31, since this would increase the size needed for the separator 28 and would make it challenging, if not impossible, to avoid removing non-dairy fat as part of the byproduct butterfat 31. Removal of a combined fat stream containing both byproduct butterfat 31 and non-dairy fat would typically be expected to diminish the market value of any butterfat 31 that is removed from the process 10 as byproduct.

As another alternative, it is also permissible to add aqueous ingredients and/or ingredients in aqueous solution to the butter solids intermediate 44 in the weigh and mix tank 46 so that these aqueous ingredients and/or aqueous solutions of ingredients are incorporated as part of the water-in-fat dispersion that exits the weigh and mix tank 52 as the intermediate blend 56. One example of a suitable aqueous ingredient is water. Some non-exhaustive examples of other suitable aqueous solutions of ingredients include water-based sweeteners, such as molasses and malt syrup. Furthermore, small amounts of liquid dairy materials, such as milk, cream, whey, whey protein concentrate, and any combination of any of these, may permissibly be added to the weigh and mix tank 46 for incorporation into the water-in-fat dispersion for any desired purpose, such as modifying the viscosity of the water-in-fat dispersion that exits the tank 52 as the intermediate blend 56. Again, addition of components to the tank 40 other than butter, such as the butter of the feed material 12, or components not derived from butter may mean that the intermediate blend 56, the light butter 62, the solidified light butter 66, and the packaged light butter product 70 will no longer properly be labeled as "light butter" products in accordance with the present dietary labeling standards of United States regulatory authorities, such as the U.S. Department of Agriculture (U.S.D.A.)

After exiting the weigh and mix tank 52, optional additive(s) 58 may be combined with the intermediate blend 56 in the blend tank 60. Some non-exhaustive examples of suitable additive(s) 58 include coloring agent(s); vitamins and minerals, such as Vitamin A and betacarotene; other conventional additives to margarines and fat-based spreads, such as food grade lactic acid (as an acidulant); and any of these in any combination. The additive(s) 58 may generally include any individual component or any combination of any of these components at any concentration. The combination of the intermediate blend 56 and the additive(s) 58 is subjected to mild agitation in the blend tank 60 to blend the additive(s) 58 into the water-in-fat dispersion (intermediate blend 56) previously formed in the tanks(s) 52.

The blend tank 60 is preferably jacketed and equipped with a temperature controller to permit heating and cooling of the tank 60 to attain or maintain a desired temperature of components that are added to, and blended together in, the blend tank 60. In the process 10, only one of the tanks 60 is typically required, even if two of the tanks 52 are used, since filling of the tank 60, processing of the components in the tank 60, and emptying of the tank 60 ordinarily takes less time than filling the tank 52 and forming the water-in-fat dispersion in the tank 52 that is preparing the next batch for the tank 60. In one embodiment, the tank 60 has the same configuration as the tank 52 and has a capacity of about 600 gallons (about 2271 liters). Therefore, one suitable example of the tank 60 is the WPDA (600 gallon\2271 liter capacity) process tank that is available from Waukesha Cherry-Burrell.

After being formed in the tank 60, the light butter 62 may be transferred to the crystallization equipment 64, such as one or more swept surface heat exchangers. In the swept surface heat exchanger(s), the light butter 62, under heavy mechanical treatment and rapid cooling, is supercooled and crystalized to transform the water-in-fat dispersion created in the tank 52 and maintained in the tank 60 into a water-in-fat matrix and to stabilize and work the water-in-fat matrix. One suitable example of the swept surface heat exchanger is the Votator® 672DE swept surface heat exchanger that is available from Waukesha Cherry-Burrell of Delavan, Wis. As an alternative to the swept surface heat exchanger(s), any equipment, such as a chilled roller type of exchanger, that is capable of supercooling the water-in-fat dispersion that is transferred from the tank 60 and causing crystallization of fat in the water-in-fat dispersion to form the water-in-fat matrix may be employed as the crystallization equipment 64.

As yet another alternative, the light butter 62 may be sent directly to the packing equipment 68, without undergoing the cooling and crystallization in the crystallization equipment 64, in those applications where it is desired for the final packaged product to be in a liquid or semi-liquid form, such as in the form of a pourable or squeezable light butter. As another example, where precrystalization of some fat was permitted to occur in the tank 52, and where this precrystalization has been maintained or enhanced in the tank 60, fat in the light butter 62 may be permitted to complete the desired amount of crystallization after the packing equipment 68 has placed the light butter 62 in packaging.

The present invention provides a method and the process 10 for producing butter-based products, such as a light butter, that contain a higher concentration of interfacial butter solids than in the feed material 12 that is introduced into the process 10. This is important, because it has been found that the phospholipids portion of the interfacial butter solids enhances the body of baked goods during the baking process and provides the rich characteristic "butter" flavor to products incorporating the intermediate blend 56 or products derived from the intermediate blend 56, without using any artificial flavoring to simulate the "butter" taste. Indeed, the ability to concentrate the interfacial butter solids in products produced in accordance with the present invention enhances the body yielding capabilities, beyond the enhancement provided by freshly produced butter alone, during baking, and enhances the butter taste and characteristic mouth-feel beyond that contributed by freshly produced butter alone, prior to processing of the butter in accordance with the present invention.

Furthermore, the protein and lactose components of the interfacial butter solids enhance the browning properties of products that include the interfacial butter solids. Therefore, increasing the interfacial butter solids concentration in the intermediate blend 56 and derivatives of the intermediate blend 56, as compared to the concentration of interfacial butter solids present in butter prior to processing in accordance with the present invention, enhances the browning properties of goods incorporating the light butter and butter-based products prepared in accordance with the present invention. Additionally, the ability to optionally modify the fat profile and thereby control the softness/hardness of butter-based products by optionally incorporating non-dairy fat, while concentrating the interfacial butter solids content compared to the original feed material 12, generates innumerable flexible use opportunities for butter-based products prepared in accordance with the present invention, while retaining the enhanced butter flavor, baking, and browning properties of the butter-based products that may be produced in accordance with the present invention, as compared to that present in the butter of the feed 10.

Finally, the ability to create butter-based products that may optionally exclude preservatives and include only natural ingredients, such as butter, salt, natural coloring agents, and natural non-dairy fat, such as vegetable oil, permits marketers of butter-based products produced in accordance with the present invention to market these butter-based products as natural products having only natural ingredients on the ingredient list. Also, when marketing many of the butter-based products that may be produced in accordance with the present invention, there is no need to include long chemical names for artificial ingredients and emulsifying agents, such as monoglycerides and diglycerides, since many butter-based products of the present invention may optionally be produced without adding artificial ingredients, such as monoglycerides and diglycerides.

Property Analysis and Characterization Procedure

Unless otherwise indicated, all determinations of moisture concentration, fat concentration, salt concentration, and solids non-fat concentration are to be made in accordance with the following procedure, which is referred to as Procedure A, for the following streams (collectively referred to as the "streams"): the feed material 12, the liquid feed material 16, the mixed liquid feed material 20, the reduced water-content material 26, the butterfat 30, the byproduct butterfat 31, the butter solids intermediate 32, the butterfat 38, the emulsifying agent 42, the butter solids intermediate 44, the butterfat component 50, the butter solids intermediate 54, the intermediate blend 56, and derivatives of the intermediate blend 56, with one exception. The exception is that this Procedure A is not used for fat determinations for the streams or derivatives of the streams when the streams or derivatives of the streams have a fat concentration below 40 weight percent, based on the total weight of the sample being analyzed.

Instead, when any particular stream or derivative of a stream, based on the total weight of the stream or the derivative of the stream, another procedure (Procedure B) that is discussed more fully below, is substituted in place of the fat determination method of Procedure A. The fat determination achieved using Procedure B is thereafter used in the solids non-fat equation of Procedure A for purposes of determining the solids non-fat concentration in any of the streams or any derivatives of any of the streams when any stream or stream-derivative that is being analyzed has a fat concentration below 40 weight percent, based on the total weight of the stream or stream derivative that is being analyzed. Again, however, unless otherwise indicated, all determinations of moisture concentration, salt concentration, and solids non-fat concentration are to be made in accordance with Procedure A for the streams and derivatives of the streams when the stream or stream-derivative being analyzed has a fat concentration of 40 weight percent, or more, based on the total weight of the stream or stream derivation that is being analyzed.

Procedure A

This Procedure A involves the sequential determination of moisture content, then the fat content, then the salt content, and finally the solids non-fat content on a particular sample. Specifically, a weighed sample is first heated to evaporate moisture and then is re-weighed to measure the moisture lost. Then, fat is extracted from the sample using petroleum ether, and the solids remaining in the sample are then re-weighed to determine the fat content. Next, the remaining sample is dissolved in hot water and the salt content is determined by titration. Finally, the moisture content, the fat content, and the salt content that have been determined for the sample are subtracted from 100% to determine the solids non-fat content of the sample. These procedures for moisture content, fat content, salt content, and solids non-fat content determination are detailed more fully below.

All samples are refrigerated at 4° C., unless being prepared for sample analysis. Samples that are being prepared for analysis must first be tempered to room temperature (about 20° C. to about 25° C.) prior to sample analysis.

Moisture Determination (Procedure A)

To determine the moisture content of an original sample, a clean, dry aluminum beaker that has been tempered to room temperature (about 20° C. to about 25° C.) is weighed on an analytical balance with a sensitivity of 0.1 milligrams. The material to be sampled is then warned and mixed to permit a representative sample to be taken. This warming of the material to be sampled may be done by heating the material to be sampled in a water bath at a temperature between about 32° C. and about 35° C. Care must be taken to avoid any phase separation in the sample. Phase separation of liquid butter will typically not occur initially and will be delayed for a period of time if the temperature of the water bath is held below about 43° C. Alternatively, the material to be sampled may be warmed at room temperature until the material reaches a consistency that permits mixing and subsequent sampling of the material.

About 10 grams of a well mixed sample (the "original sample") is placed into the aluminum beaker and accurately weighed on the analytical balance. The sample in the aluminum beaker is then heated on a hot plate or an equivalent heat source, while swirling the sample continuously to avoid spattering and burning of any milk solids contained in the sample. Heating is continued to cause evaporation of water from the sample until all foaming and bubbling of the sample has stopped and any milk solids contained in the sample appear light brown in color.

For oil and butterfat samples that contain little moisture, evaporation of any moisture content may only take between about 30 and about 60 seconds. Care should be taken to obtain a uniform color between each sample being analyzed for water content. If a dark brown color appears in the sample that is being heated, the milk solids content of the sample have been burned and this sample should be rerun.

After evaporation on the hot plate has been completed, the aluminum beaker is cooled to room temperature (about 20° C. to about 25° C.). Thereafter, the aluminum beaker and its contents are weighed on the analytical balance and the weight is recorded as the "weight of beaker+moisture-free residue."

The weight percent of moisture in the sample, based on the total weight of the sample, may be determined in accordance with the following calculations:

Weight of original sample=[(Weight of beaker+original sample)−weight of beaker]

$$\% \text{ Moisture} = \frac{(\text{Weight of beaker} + \text{original sample}) - (\text{Weight of beaker} + \text{Moisture-free residue})}{\text{Weight of Original Sample}} \times 100$$

Fat Analysis (Procedure A)

The fat content of the original sample is then determined by placing the aluminum beaker containing the moisture-free residue from the moisture-determination step in a slanted beaker holder under an exhaust hood. Then, 100 milliliters of petroleum ether is measured into the aluminum beaker. Next, the mixture of the sample and the added ether is stirred using a rubber policeman to dissolve the fat contained in the sample. Stirring is then stopped and the sample is allowed to rest for at least about 3 minutes to permit any solids in the sample to settle. Thereafter, using a vacuum source, the ether/fat mixture is carefully suctioned from the beaker, while being careful not to suction any of the milk solids that have dropped to the bottom of the beaker.

Then, 75 milliliters of petroleum ether is measured into the beaker and the contents of the beaker are again stirred with the rubber policeman to dissolve additional fat. Stirring is again stopped and the beaker is allowed to rest at least 3 minutes to permit solids to settle to the bottom of the beaker. The vacuum source is again applied to suction the mixture of ether and fat from the beaker, while being careful not to suction any milk solids from the beaker.

Fifty milliliters of petroleum ether is placed into the beaker and stirred again with the rubber policeman to dissolve any fat remaining in the sample. The beaker is allowed to rest at least three minutes to permit settling of any solids in the beaker. The vacuum apparatus is again applied to carefully suction the mixture of fat and ether from the beaker, while again being careful not to suction any milk solids from the beaker.

The beaker is allowed to dry under the fume exhaust hood until the beaker and its contents attain a constant weight, as determined by measurement on the analytical balance. After the beaker has attained a constant weight, the weight of the beaker and its contents is determined and this weight is recorded as "weight of beaker+fat-free residue". Then, the weight percent of fat in the original sample, based upon the total weight of the original sample, is calculated using the following formula:

$$\% \text{ Fat} = \frac{(\text{Weight of beaker} + \text{Moisture-free residue}) - (\text{Weight of beaker} + \text{fat-free residue})}{\text{Weight of Original Sample}} \times 100$$

Salt Analysis (Procedure A)

Reverse osmosis/distilled water is heated to a temperature of about 65° C. to about 70° C. One hundred fifty (150) milliliters of the heated water is measured into the beaker containing the fat-free residue obtained in the fat analysis procedure. A rubber policeman is used to stir the contents of the beaker to dissolve the salt in the hot water. The beaker and its contents are allowed to cool to room temperature (about 20° C. to about 25° C.). A twenty-five milliliter sample of the water/salt mixture in the beaker is withdrawn and pipetted into a 125 milliliter Erlenmeyer flask. To prevent withdrawal of milk solids from the beaker, the tip of the pipet must be held off of the bottom of the beaker while withdrawing the water/salt sample. Two to three drops of potassium chromate indicator are placed in to the Erlenmeyer flask. The contents of the Erlenmeyer flask are then titrated with 0.01711 N (normal) silver nitrate solution until the first reddish-brown color lasting 30 seconds is obtained in the sample being titrated. Thereafter, the weight percent of salt based upon the total weight of the original sample, is determined using the following formula:

$$\% \text{ Salt} = \frac{\text{mililiters of silver nitrate (AgNO}_3)}{\text{Weight of Original Sample}} \times 100$$

Solids Non-Fat Determination (Procedure A)

After the weight percent of moisture, fat, and salt in the sample have been determined, these percentages are plugged into the following formula to determine the weight percent of solids non-fat, based on the total weight of the original sample, that is contained in the original sample:

% Solids non-fat=100%−(% Moisture+% Fat+% Salt)

General Comments about the Fat, Moisture, Salt, and Solids Non-Fat Determinations of Procedure A The detection limit of this method for moisture, fat, salt, and solids non-fat is 0.01 weight percent. Any results less than 0.01 weight percent should be reported as "less than 0.01 weigh percent". At least one duplicate analysis that includes moisture, fat, salt, and solids non-fat should be conducted each day the analysis is performed. Also, at least one in every twenty samples should be analyzed in duplicate for moisture, fat, salt, and solids non-fat. Suitable differences between duplicates are listed below:

Moisture: 0.30 weight percent

Fat: 0.40 weight percent

Salt: 0.10 weight percent

Solids non-fat: 0.10 weight percent

Procedure B

Fat Analysis

Unless otherwise indicated, all determinations of fat content for the following streams (collectively referred to as the "streams"): the feed material 12, the liquid feed material 16, the mixed liquid feed material 20, the reduced water-content material 26, the butterfat 30, the byproduct butterfat 31, the butter solids intermediate 32, the butterfat 38, the emulsifying agent 42, the butter solids intermediate 44, the butterfat component 50, the butter solids intermediate 54, the intermediate blend 56, and derivatives of the intermediate blend 56, and any derivative of any of these streams, when any of these streams or any derivative of any of these streams has a fat concentration below 40 weight percent, based on the total weight of the stream or stream derivative being analyzed, are made in accordance with the following procedure, which is referred to as Procedure B. The fat determination technique of Procedure B follows Method #920.111 of *Official Methods of Analysis*, Association of Official Analytical Chemists (AOAC) (16th Ed., 1995), as supplemented in March, 1996. This AOAC Method #920.11 is commonly referred to as the Mojonnier modification of the Roese-Gottleib Method. All samples are refrigerated at 4° C., unless being prepared for sample analysis. Samples that are being prepared for analysis must first be tempered to room temperature (about 20° C. to about 25° C.) prior to sample analysis.

Phospholipids Determination

Unless otherwise indicated, all determinations of phospholipids concentration are determined in accordance with the rapid high performance liquid chromatography (rapid HPLC method) that is set forth in the article entitled *Phospholipids in Milk and Dairy Products* by W. W. Christie, R. C. Noble, and G. Davies that appears in Volume 40, Number 1 of the *Journal of the Science of Dairy Technology* dated February, 1987. This *Phospholipids in Milk and Dairy Products* article is consequently incorporated by reference in its entirety. All samples to be analyzed in accordance with this Phospholipids Determination procedure are refrigerated at 4° C., unless being prepared for sample analysis. Samples that are being prepared for analysis in accordance with this Phospholipids Determination procedure should first be tempered to room temperature (about 20° C. to about 25° C.) prior to sample analysis.

EXAMPLES

The present invention is more particularly described in the following example which is intended as an illustration only since numerous modifications and variations within the scope of the present invention will be apparent to those skilled in the art.

Example 1

This example illustrates use of the process of the present invention to transform unsalted butter into a light butter. First, about 2745 grams of unsalted butter were placed in a heavy-bottom, stainless steel pan. The stainless steel pan was slowly heated to melt the unsalted butter. The moisture content of the melted unsalted butter was determined to be about 17.3 weight percent, based on the total weight of the melted unsalted butter blend; thus, the melted unsalted butter contained about 476 grams of water.

After determining the moisture content of the melted unsalted butter, the stainless steel pan was further heated on low to bring the melted unsalted butter to a rolling boil. The boiling unsalted butter was agitated with a Type RZRI lab mixer that may be obtained from Caframo, Ltd. of Wiarton, Ontario, Canada. The Caframo lab mixer was operated at set point 5. The Caframo lab mixer had a four blade mixer with an overall mixer blade diameter of 1⅞ inches (4.76 centimeters). The four blade mixer was operated at about 1520 revolutions per minute (rpm).

While being agitated, the temperature of the boiling unsalted butter ranged from about 208° F. (about 97.8° C.) to about 218° F. (about 103.3° C.). The unsalted butter was agitated and boiled to remove water until the concentration of water in the boiling unsalted butter reached about 8.7 weight percent, based on the total weight of the boiling unsalted butter. Thus, about 259 grams of the original 476 grams of water in the initial unsalted butter were removed, leaving about 217 grams of water in the concentrated unsalted butter that resulted from boiling the initial unsalted butter.

The concentrated unsalted butter obtained by evaporating water was then cooled and frozen overnight to help separate the aqueous phase of the unsalted butter from the fat phase of the unsalted butter. The following day, the frozen concentrated unsalted butter was slowly reheated in the stainless steel pan to liquify the fat until the fat layer and aqueous layer fully stratified. Then, about 2060 grams of butterfat were extracted from the stratified concentrated unsalted butter to form a butter solids intermediate that contained primarily water and interfacial butter solids. About 6.5 grams of salt (sodium chloride) were added to and mixed with the butter solids intermediate to form a salted butter solids intermediate.

About 163 grams of the withdrawn butterfat were reserved and heated to about 155° F. (about 68.3° C.). Then, about 2.64 grams of an emulsifying agent were added to and blended with the 163 grams of butterfat under moderate agitation sufficient to disperse the emulsifying agent within the butterfat. The temperature of the butterfat/emulsifying agent blend was then adjusted to about 117° F. (about 47.2° C.), and the salted butter solids intermediate was heated to about 72° F. (about 22.2° C.). Next, under conditions of high shear mixing, the salted butter solids intermediate was slowly added to the butterfat/emulsifying agent blend to form an intermediate blend.

After addition of the salted butter solids intermediate to the butterfat/emulsifying agent blend, about 0.40 grams of an aqueous lactic acid solution (12 weight percent water and 88 weight percent lactic acid, based on the total weight of the aqueous lactic acid solution) were mixed with the intermediate blend. The acidified intermediate blend was then agitated while being cooled to permit formation of the water-in-fat matrix characteristic of margarines and butter and to permit crystallization of the fat in the completed light butter.

Specifically, the acidified intermediate blend was placed into a stainless steel beaker. The stainless steel beaker was then placed in an ice water bath. The Caframo type RZRI lab mixer was then positioned proximate the beaker with the mixer blade located in the beaker. The mixer was then turned on at set point 5 at approximately 1520 rpm to convert the acidified intermediate blend into a water-in-fat dispersion and crystallize the butterfat. The beaker was rotated in a direction counter to the direction of the mixer blade rotation and a stainless steel spatula was used to continuously sweep solidified fat from the inside surface of the beaker. This process was maintained until sufficient fat had solidified to form a fairly homogeneous mass.

The starting composition of the unsalted butter and the final composition of the completed light butter, along with component removal and additional details, are presented in Table 1 below. Though no data was obtained on the amount of interfacial butter solids initially present in the unsalted butter or in the completed light butter, it is believed that all, or essentially all, of the interfacial butter solids originally present in the unsalted butter remained in the light butter, since no solids were removed during evaporation of the water and since no solids were visually observed to be present in the discarded portion of the butterfat.

Also, since the concentration of the portion (measured as solids non-fat) of the interfacial butter solids present in the aqueous phase of unsalted butter is typically on the order of about 1.7 weight percent, based on the total weight of the butter, the removal of about 261 grams of the about 476 grams of water originally present in the butter is believed to have concentrated the portion (measured as solids non-fat) of the interfacial butter solids present in the aqueous phase by about two times, relative to the concentration of the portion (measured as solids non-fat) of the interfacial butter solids originally present in the aqueous phase of the unsalted butter used as the feed in this example.

TABLE 1

| Feed | | | | Butter Components | Added Components | | Product | | |
|---|---|---|---|---|---|---|---|---|---|
| | | Composition | | Removal | | | | Composition | |
| Ingredient | Component | Wt % | Grams | (grams) | Ingredient | Grams | Component | Wt % | Grams |
| Butter | Water | 17.3 | 476 | 259 | | | Water | 49.8 | 217 |
| | SNF* | 1.7 | 46 | | | | SNF* | 10.6 | 46 |
| | Butterfat | 81.0 | 2223 | 2060 | | | Butterfat | 37.4 | 163 |
| | | | | | Salt | 6.5 | Salt | 1.5 | 6.5 |
| | | | | | Lactic Acid Solution | 0.4 | Lactic Acid Solution | 0.1 | 0.4 |
| | | | | | Emulsifying agent | 2.6 | Emulsifying agent | 0.6 | 2.6 |
| | TOTAL | 100.00 | 2345 | | TOTAL | 9.5 | TOTAL | 100.00 | 435.5 |

*Solids Non-Fat

A sample of salted butter, a sample of a light butter available from Keller's of Harleysville, Pa., and a sample of the light butter produced in accordance with this example were taste tested by a panel of tasters. The panel of tasters overwhelmingly preferred the taste of the light butter of this example to the taste of the salted butter because the light butter had a richer butter taste than did the salted butter itself. This is believed due to the higher interfacial butter solids concentration in the light butter of the present invention, versus the interfacial butter solids concentration in the salted butter considered by the taste panel.

The panel of tasters also overwhelmingly preferred the taste of the light butter of this example to the taste of the Keller's light butter because the light butter of this example had a more intense flavor impact, a better fatty mouth-feel, and a more buttery taste, as compared to the Keller's light butter. This again is believed due to the higher interfacial butter solids concentration in the light butter of this example, versus the interfacial butter solids concentration in the Keller's light butter considered by the taste panel.

The taste panel's preference of the light butter over traditional salted butter and over the Keller's light butter occurred even though the light butter of this example, and thus the interfacial butter solids, were somewhat process-abused during processing to form the light butter, since the butter used as the feed material in this example was actually boiled to effect evaporation of water. Processing at reduced temperature conditions would be expected to further enhance the preference of the taste panel for the light butter of the present invention.

COMPARATIVE EXAMPLE NO. 1

In this comparative example, an attempt was made to produce margarine by starting with cream containing 40 weight percent milk fat, based upon the starting weight of the cream, instead of starting with churned butter, to create a margarine. The cream was processed through the third effect, only, of a triple effect evaporator that was maintained at about 25 inches (about 63.5 centimeters) of mercury vacuum. The cream was introduced into the evaporator at a temperature of about 136° F. (about 57.8° C.). In Table 2 below, the pounds of water shown for the cream feed (40 wt % fat) is about 400 pounds (about 181.4 kilograms) greater than for the cream feed alone because approximately 400 pounds (about 181.4 kilograms) of process water was inadvertently added to the cream feed during transfer of the cream feed to the evaporator.

The third effect of the triple effect evaporator was actually a finishing effect for small volumes that followed a larger double effect evaporator. The double effect evaporator was not used in this comparative example. Only the finishing effect (the third effect) was used for water evaporation from the cream in this example. This finishing effect evaporator was a falling film evaporator that is available from Marriott Walker Corporation of Birmingham, Mich. Vacuum on this falling film evaporator was provided by a thermal compressor that is available from Croll-Reynolds Company of Westfield, N.J. After water was removed in the evaporator, the reduced moisture cream was placed in a mix tank and combined with some hydrogenated soybean oil and some liquid soybean oil, along with some salt.

Thereafter, the mixture of reduced moisture cream and soybean oil was blended using an agitator in the mix tank to form a homogeneous water-in-fat/oil dispersion. The water-in-fat/oil dispersion was then transferred to a crystalizing exchanger. In this comparative example, the crystalizing exchanger was a Votator® 672DE swept surface heat exchanger available from Waukesha Cherry-Burrell. The water-in-fat/oil dispersion was processed through the swept surface heat exchanger to an outlet temperature of about 58° F. (about 14.4° C.).

The composition of the cream used as feed in this comparative example, and the product composition, along with component removal and addition details, are presented in Table 2 below. The intended amount of water removal in this comparative example was less than the actual amount of water removal that is shown in Table 2 as being removed. Approximately 400 pounds (about 181.4 kilograms) of extra water was removed in the evaporator to compensate for the approximately 400 pounds (about 181.4 kilograms) of process water that was inadvertently added to the cream feed to the evaporator. Also, some unintended butterfat removal, along with some unintended water removal, occurred as a result of line losses between the mix tank and the crystalizing exchanger. Furthermore, some solids non-fat removal likewise occurred due to line losses in the line connecting the mix tank and the crystalizing exchanger.

TABLE 2

| | Feed | | | Pounds of | Components Added To The Concentrated Cream Feed | | Product | | |
|---|---|---|---|---|---|---|---|---|---|
| | | Composition | | Component | | | | Composition | |
| Ingredient | Component | Wt % | Pounds (kg) | Removal (kg) | Ingredient | Pounds (kg) | Component | Wt % | Pounds (kg) |
| Cream* | Water | 67.98 | 964* (~436) | 853.2 (~296) | | | Water | 12.80 | 110.8 (~50) |
| | Butterfat | 28.21 | 400 (~181) | 52 (~24) | Butterfat | 0 (0) | Butterfat | 40.19 | 348 (~158) |
| | Salt | 0.00 | 0 (0) | | Salt | 13.4 (~6) | Salt | 1.55 | 13.4 (~6) |
| | SNF** | 3.81 | 54 (~24) | | | | SNF** | 5.28 | 45.7 (~21) |
| | | | | | Oil*** | 226 (~102) | Oil*** | 26.10 | 226 (~102) |
| | | | | | Oil**** | 122 (~55) | Oil**** | 14.08 | 122 (~55) |
| | TOTAL | 100.00 | 1418 (~643) | | TOTAL | 361.4 (~163) | TOTAL | 100.00 | 865.9 (~392) |

*Includes approximately 400 pounds (about 181.4 kilograms) of process water that was inadvertently added to the cream feed during transfer of the cream feed to the evaporator
**Solids Non-Fat
***hydrogenated soybean oil
****liquid soybean oil This comparative example yielded two striking observations. First, during processing of the cream in the evaporator, it was observed that significant fouling and clogging occurred in the evaporator. This is believed to be a result of the aqueous phase of the cream containing an excessive amount of solids as evaporation of water proceeded, since a much larger percentage of incoming water must be evaporated from cream containing 40 weight percent fat, as compared to the amount of water to be evaporated from butter, to achieve a similar fat/water ratio in the completed product.

Furthermore, the initial concentration of solids in cream containing 40 weight percent fat is significantly higher than the concentration of comparable solids in butter, since churning of cream to form butter removes, in the buttermilk product of the churning process, a significant amount of solids from the incoming cream being churned. The evaporator clogging problem significantly reduced the flow rate of cream through the evaporator as fouling and clogging increased in the evaporator during the run. Nonetheless, some flow of reduced water cream through the evaporator did continue so that margarine was ultimately able to be formed in the crystallizing exchanger.

When provided to a taste panel, the tasters found that the margarine produced in this comparative example had a flavor that was not acceptable. Specifically, the flavor of the margarine, as compared to the flavor of butter, was merely milky, had a greatly diminished fatty taste or mouth-feel, and virtually no butter flavor, as compared to butter. Thus, this comparative example demonstrates that it is not feasible or acceptable to use cream that has not been churned into butter, as a substitute for butter, in or as the feed material 12 of the present invention.

Although the present invention has been described with reference to preferred embodiments, workers skilled in the art will recognize that changes may be made in form and detail without departing from the spirit and scope of the invention.

What is claimed is:

1. A method of forming a butter-based product from butter, the butter having an initial butterfat content and an initial interfacial butter solids content, the method comprising:
   removing water from the butter;
   removing a selected amount of butterfat from the butter without removing significant amounts of interfacial butter solids to form a reduced butterfat intermediate;
   separating the reduced butterfat intermediate into a primarily butterfat intermediate and a primarily interfacial butter solids intermediate;
   combining the primarily reduced butterfat intermediate and the primarily interfacial butter solids intermediate to form the butter-based product and at a ratio in which the butterfat content is lower than the initial butterfat content of the butter.

2. The method of claim 1, the method further comprising blending an emulsifying agent with the reduced butter intermediate.

3. The method of claim 2 wherein the emulsifying agent comprises a monoglyceride, a diglyceride, a propylene glycol monoester, a lactylated ester, a polyglycerol ester, a sorbitan ester, an ethoxylated ester, a succinylated ester, a fruit acid ester, an acetylated monoglyceride, a phosphated ester, a sucrose ester, interfacial butter solids, or any of these in any combination.

4. The method of claim 1 wherein the concentration of butterfat in the butter-based product being about 40 weight percent, or less, based upon the total weight of the butter-based product.

5. The method of claim 1 wherein the the primarily butterfat intermediate and the primarily interfacial butter solids intermediate collectively containing at least about 95 weight percent of the interfacial butter solids of the butter, based on the total weight of the interfacial butter solids in the butter.

6. The method of claim 1 wherein the butter comprises interfacial butter solids, the butter-based product having a higher concentration of interfacial butter solids than the butter.

7. The method of claim 1 wherein: the butter comprises a first interfacial butter solids portion; the first interfacial butter solids portion includes phospholipids, proteins, and sugars; the butter-based product comprises a second interfacial butter solids portion; the second interfacial butter solids portion includes phospholipids, proteins, and sugars; and the concentration of the second interfacial butter solids portion in the butter-based product, based upon the total weight of the butter-based product, is higher than the concentration of the first interfacial butter solids portion in the butter, based upon the total weight of the butter.

8. The method of claim 1 wherein the butter comprises an aqueous phase having the interfacial butter solids, and wherein the reduced water content butter contains all of the interfacial butter solids from the aqueous phase of the butter.

9. The method of claim 1 wherein the butter comprises melted butter, the melted butter comprises an aqueous phase, and the aqueous phase includes the interfacial butter solids, the reduced water content butter intermediate containing all of the interfacial butter solids from the aqueous phase of the melted butter.

10. The method of claim 1, the method further comprising heating the butter to form melted butter, and wherein removing water or butterfat from the butter comprises removing water or butterfat from the melted butter.

11. The method of claim 10 wherein removing water from the melted butter comprises evaporating water from the melted butter.

12. The method of claim 1 and
   crystallizing the butterfat when the primarily reduced butter fat intermediate and the primarily interfacial butter solids intermediate are combined.

13. The method of claim 12 wherein an emulsifying agent is added when the primarily reduced butter fat intermediate and the primarily interfacial butter solids intermediate are combined.

14. The method of claim 13 wherein the emulsifying agent comprises an emulsifying agent other than, or in addition to, the interfacial butter solids.

15. A butter-based product produced by the method of claim 1.

16. The butter-based product of claim 15, the butter-based product further comprising an emulsifying agent, the emulsifying agent including a monoglyceride, a diglyceride, a propylene glycol monoester, a lactylated ester, a polyglycerol ester, a sorbitan ester, an ethoxylated ester, a succinylated ester, a fruit acid ester, an acetylated monoglyceride, a phosphated ester, a sucrose ester, or any of these in any combination.

17. The butter-based product of claim 15 wherein the butter-based product further comprises an emulsifying agent other than interfacial butter solids.

18. The butter-based product of claim 15 wherein the concentration of butterfat in the butter-based product is about 40 weight percent, or less, based upon the total weight of the butter-based product.

19. The butter-based product of claim 15 wherein the butter further comprises water and butterfat, the weight ratio of butterfat to water in the butter-based product being lower than the weight ratio of butterfat to water in the butter.

20. The method of claim 1 wherein the concentration of butterfat in the butter-based product being about 40 weight percent, or less, based upon the total weight of the butter-based product.

21. A method of forming a butter-based product from butter, the butter having an initial interfacial butter solids content, the method comprising:
removing water from the butter;
removing a selected amount of butterfat from the butter without removing significant amounts of interfacial butter solids to form a reduced butterfat intermediate;
separating the reduced butterfat intermediate into a primarily butterfat intermediate and a primarily interfacial butter solids intermediate;
combining the primarily reduced butterfat intermediate and the primarily interfacial butter solids intermediate to form the butter-based product and at a ratio in which the interfacial butter solids content is higher than the initial interfacial butter solids content of the butter.

22. The method of claim 21, the method further comprising blending an emulsifying agent with the reduced butter intermediate.

23. The method of claim 22 wherein the emulsifying agent comprises a monoglyceride, a diglyceride, a propylene glycol monoester, a lactylated ester, a polyglycerol ester, a sorbitan ester, an ethoxylated ester, a succinylated ester, a fruit acid ester, an acetylated monoglyceride, a phosphated ester, a sucrose ester, interfacial butter solids, or any of these in any combination.

24. The method of claim 21 wherein the primarily butterfat intermediate and the primarily interfacial butter solids intermediate collectively containing at least about 95 weight percent of the interfacial butter solids of the butter, based on the total weight of the interfacial butter solids in the butter.

25. The method of claim 21 wherein the butter comprises a first interfacial butter solids portion wherein the first interfacial butter solids portion includes phospholipids, proteins, and sugars and the butter-based product comprises a second interfacial butter solids portion and wherein the second interfacial butter solids portion includes phospholipids, proteins, and sugars.

26. The method of claim 21 wherein the butter comprises an aqueous phase having the interfacial butter solids, and wherein the reduced water content butter contains all of the interfacial butter solids from the aqueous phase of the butter.

27. The method of claim 21 wherein the butter comprises melted butter, the melted butter comprises an aqueous phase, and the aqueous phase includes the interfacial butter solids, the reduced water content butter intermediate containing all of the interfacial butter solids from the aqueous phase of the melted butter.

28. The method of claim 21 the method further comprising heating the butter to form melted butter, and wherein removing water or butterfat from the butter comprises removing water or butterfat from the melted butter.

29. The method of claim 28 wherein removing water from the melted butter comprises evaporating water from the melted butter.

30. The method of claim 21 and crystallizing the butterfat when the primarily reduced butter fat intermediate and the primarily interfacial butter solids intermediate are combined.

31. The method of claim 30 wherein an emulsifying agent is added when the primarily reduced butter fat intermediate and the primarily interfacial butter solids intermediate are combined.

32. The method of claim 30 wherein the emulsifying agent comprises an emulsifying agent other than, or in addition to, the interfacial butter solids.

33. A butter-based product produced by the method of claim 21.

34. The butter-based product of claim 33, the butter-based product further comprising an emulsifying agent, the emulsifying agent including a monoglyceride, a diglyceride, a propylene glycol monoester, a lactylated ester, a polyglycerol ester, a sorbitan ester, an ethoxylated ester, a succinylated ester, a fruit acid ester, an acetylated monoglyceride, a phosphated ester, a sucrose ester, or any of these in any combination.

35. The butter-based product of claim 33 wherein the butter-based product further comprises an emulsifying agent other than interfacial butter solids.

36. The butter-based product of claim 33 wherein the concentration of butterfat in the butter-based product is about 40 weight percent, or less, based upon the total weight of the butter-based product.

* * * * *